US011846572B2

(12) United States Patent
Alletto, Jr. et al.

(10) Patent No.: US 11,846,572 B2
(45) Date of Patent: Dec. 19, 2023

(54) CFM MEASURING DEVICE AND DISPLAY FOR BEDDING SURFACES AND METHODS OF USING THE SAME

(71) Applicant: BEDGEAR, LLC, Farmingdale, NY (US)

(72) Inventors: Eugene Alletto, Jr., Glen Head, NY (US); Lorenzo Turicchia, Arlington, MA (US)

(73) Assignee: Bedgear, LLC, Farmingdale, NY (US)

( * ) Notice: Subject to any disclaimer, the term of this patent is extended or adjusted under 35 U.S.C. 154(b) by 848 days.

(21) Appl. No.: 16/844,600

(22) Filed: Apr. 9, 2020

(65) Prior Publication Data

US 2021/0318206 A1 Oct. 14, 2021

(51) Int. Cl.
| | | |
|---|---|---|
| G01M 99/00 | (2011.01) | |
| A47C 21/04 | (2006.01) | |
| G01F 3/36 | (2006.01) | |
| F24F 11/74 | (2018.01) | |

(52) U.S. Cl.
CPC ......... *G01M 99/001* (2013.01); *A47C 21/042* (2013.01); *F24F 11/74* (2018.01); *G01F 3/36* (2013.01)

(58) Field of Classification Search
CPC ... G01M 99/001; A47C 21/042; A47C 21/044
See application file for complete search history.

(56) References Cited

U.S. PATENT DOCUMENTS

| | | | | |
|---|---|---|---|---|
| 2,840,435 A | * | 6/1958 | Campbell | G01M 15/02 |
| | | | | 312/223.1 |
| 4,471,649 A | | 9/1984 | Cronshaw | |
| 5,609,269 A | * | 3/1997 | Behnke | B65H 75/00 |
| | | | | 221/48 |
| 6,439,061 B1 | | 8/2002 | Nelson et al. | |
| 7,000,480 B2 | | 2/2006 | Kramer | |
| 8,006,571 B2 | | 8/2011 | Hersch et al. | |
| 8,521,449 B2 | | 8/2013 | Hamann et al. | |
| 9,007,589 B2 | | 4/2015 | Hughes et al. | |
| 2004/0144316 A1 | * | 7/2004 | Lee | H01L 21/67017 |
| | | | | 118/719 |

FOREIGN PATENT DOCUMENTS

WO  2008115138 A1  9/2008

OTHER PUBLICATIONS

Puszkarz, Adam K., Izabella Krucinska, "Modeling of Air Permeability of Knitted Fabric Using the Computational Fluid Dynamics", AUTEX Research Journal, vol. 18, No. 4, Dec. 2018, DOI: 10.1515/aut-2018-0007. (Year: 2018).*
Vaughan, John W. et al. "Evaluation of materials used for bedding encasement: Effect of pore size in blocking cat and dust mite allergen", Mosby, Inc. 1999. (Year: 1999).*

* cited by examiner

*Primary Examiner* — Paul M. West
(74) *Attorney, Agent, or Firm* — Sorell, Lenna & Schmidt, LLP

(57) ABSTRACT

A system is provided for marketing bedding. The system includes an apparatus for measuring air flow through an article of bedding having a body defining a chamber and an opening that is in communication with the chamber, an air flow generator positioned within the chamber. The system is used to measure the air flow through an article of bedding that covers the opening such that air flow created by the air flow generator passes through the article of bedding. Methods of use are provided.

25 Claims, 15 Drawing Sheets

CFM MEASURING DEVICE AND DISPLAY FOR BEDDING SURFACES AND METHODS OF USING THE SAME

TECHNICAL FIELD

The present disclosure generally relates to bedding and measuring apparatus for measuring air flow through bedding. More particularly an apparatus for measuring air flow through a pillow. Methods of use are included.

BACKGROUND

Sleep is critical for people to feel and perform their best, in every aspect of their lives. Sleep is an essential path to better health and reaching personal goals. Indeed, sleep affects everything from the ability to commit new information to memory to weight gain. It is therefore essential for people to use bedding that suit both their personal sleep preference and body type in order to achieve comfortable, restful sleep.

Studies have shown that sleeping on a surface with restricted air flow causing heat and moisture retention is not conducive for restful sleep. Moreover, these studies have shown that sleeping on a surface, after a long time, that increases moisture and uncomfortable temperature levels can cause or trigger illnesses such as, for example, migraines, Alzheimer's disease, glaucoma, sleep apnea, stroke, impotency, and similar illnesses. Finding the right sleeping surface, for example pillow, having good airflow is important for establishing good sleeping conditions. Testing the air flow of a pillow is essential in choosing the correct pillow for the individual to provide the best sleeping conditions. This disclosure describes a simple easy to use testing/display to show the airflow through a bedding surface, for example a pillow, relative to another surface.

SUMMARY

In one embodiment, in accordance with the principles of the present disclosure, a system is provided for marketing bedding and evaluating bedding based on air flow. The system includes an apparatus for measuring air flow through an article of bedding, for example a pillow. The apparatus comprising a body defining an interior chamber having a top, a bottom and a plurality of walls configured to form the interior chamber, the top having a surface comprising an opening that is in communication with the interior chamber. The apparatus further comprising an air flow generator in fluid communication with the interior chamber wherein the top surface is configured to support the article of bedding positioned to cover the opening such that air flow created by the air flow generator passes through the article of bedding. The air flow can be observed by the customer and used in deciding which article of bedding should be purchased. In some embodiments, the air flow generator is a fan comprising a motor that is electrically coupled to one of the user interfaces.

In one embodiment, in accordance with the principles of the present disclosure, a system for comparing air flow through a first article of bedding to the air flow through a second article of bedding is provided. The system comprising a first body defining a first interior chamber having a top, a bottom and a plurality of walls configured to form the first interior chamber. The top having a surface comprising an opening that is in communication with the interior chamber. A first air flow generator is provided that is in fluid communication with the first chamber. The system further having a second body defining a second interior chamber having a top, a bottom and a plurality of walls arranged to form the second interior chamber, the top having a surface comprising an opening that is in communication with the second interior chamber. The surface of the first body configured to support the first article of bedding positioned thereon so as to cover the opening in the first body such that air flow created by the first air flow generator passes through the first article of bedding and the surface of the second body is configured to support a second article of bedding positioned thereon so as to cover the opening such that air flow created by the second air flow generator passes through the second article of bedding. In one embodiment, in accordance with the principles of the present disclosure, the articles of bedding are pillows and the air flow through the first article of bedding and the air flow through the second article of bedding are displayed, measured and/or recorded so as to help the customer choose the pillow best for them.

The system may include a selection module comprising a plurality of buttons that are each in communication with one of the air generators such that pressing one of the buttons will cause one of the air flow generators to move from an "off" position to an "on" position to create airflow. In some embodiments, the air flow created by each of the air flow generators is positive airflow having the same velocity. In some embodiments, the air flow created by the air flow generators is negative air flow moving at the sample velocity. In some embodiments, the air flow generators are fans, the fans each comprising a motor that is electrically coupled to one of the buttons.

In one embodiment, in accordance with the principles of the present disclosure, a method of marketing or evaluating bedding is provided that includes positioning the article of bedding on the surface of one or both of the bodies so as to cover the openings of each of the bodies in the apparatuses described above and herein. Once in position activating at least one air flow generator to generate air flow through the article of bedding and feeling, measuring, observing and/or recording the air that flows through the article of bedding. Comparing the air flow between the first and second articles of bedding and selecting an article of bedding based on amount of air that flow through each of the first and second articles of bedding. In one embodiment, in accordance with the principles of the present disclosure, the air generators produce positive air flow, negative air flow or both. In some embodiments, in accordance with the principles of the present disclosure, the system used in the method is one or more of the embodiments of the system disclosed herein.

In one embodiment, in accordance with the principles of the present disclosure, a test station is provided that includes a test article and a housing defining a chamber. The housing is configured to support the test article such that the test article is in fluid communication with the chamber. An air flow generator is in fluid communication with the chamber. The air flow generator is configured to move air through the test article. A sensor is configured to measure pressure created by air that moves through the test article.

In one embodiment, in accordance with the principles of the present disclosure, a pillow testing station is provided that includes a test pillow and a cart comprising housing and spaced apart casters that are coupled to the housing. The housing defines a chamber and is configured to support the test pillow such that the test pillow is in fluid communication with the chamber. An air flow generator is in fluid communication with the chamber. The air flow generator is configured to move air through the test pillow. A sensor is configured to measure pressure created by air that moves through the test pillow. A processor is in communication with the sensor. The processor is configured to convert a pressure value measured by the sensor to an air flow value. A display is in communication with the processor to provide a visual representation of the air flow value.

In one embodiment, in accordance with the principles of the present disclosure, a test station is provided that includes a first test article, a second test article and a housing defining a first chamber and a second chamber that is spaced apart from the first chamber. The housing is configured to support the first test article such that the first test article is in fluid communication with the first chamber. The housing is configured to support the second test article such that the second test article is in fluid communication with the second chamber. A first air flow generator is in fluid communication with the first chamber. The first air flow generator is configured to move air through the first test article. A second air flow generator is in fluid communication with the second chamber. The second air flow generator is configured to move air through the second test article. A first sensor is configured to measure pressure created by air that moves through the first test article. A second sensor is configured to measure pressure created by air that moves through the second test article.

In one embodiment, in accordance with the principles of the present disclosure, a pillow testing station is provided that includes a first test pillow, a second test pillow and a cart comprising housing and spaced apart casters that are coupled to the housing. The housing defines a first chamber and a second chamber that is spaced apart from the first chamber. The housing is configured to support the first test pillow such that the first test pillow is in fluid communication with the first chamber. The housing is configured to support the second test pillow such that the second test pillow is in fluid communication with the second chamber. A first air flow generator is in fluid communication with the first chamber. The first air flow generator is configured to move air through the first test pillow. A second air flow generator is in fluid communication with the second chamber. The second air flow generator is configured to move air through the second test pillow. A first pressure sensor is configured to measure pressure created by air that moves through the first test pillow. A second pressure sensor is configured to measure pressure created by air that moves through the second test pillow. A processor is in communication with the sensors. The processor is configured to convert a pressure value measured by the first sensor to a first air flow value and to convert a pressure value measured by the second sensor to a second air flow value. A display is in communication with the processor to provide a visual representation of the first air flow value and the second air flow value.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1:
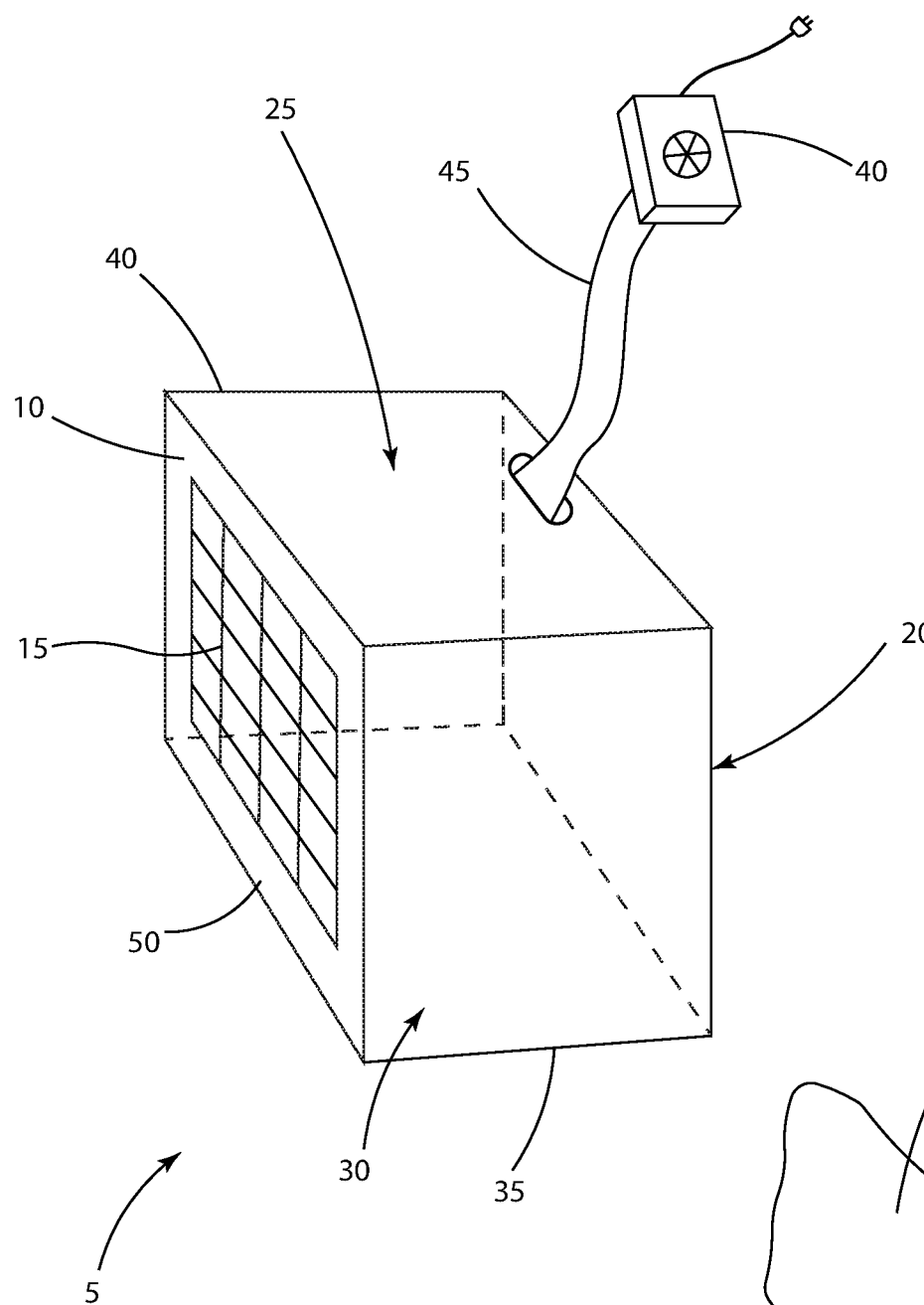
FIG. 1 is a front view of one embodiment of an apparatus for measuring air flow through an article of bedding system, in accordance with the principles of the present disclosure.
Figure 1:
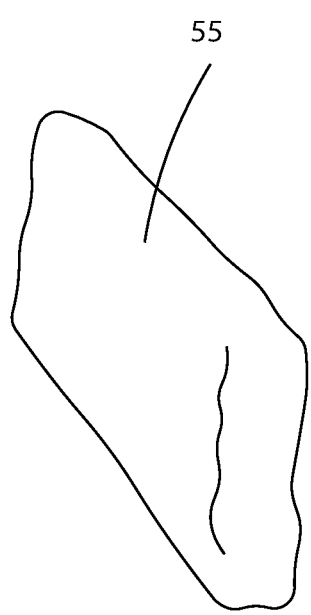

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

Reference will now be made in detail to the exemplary embodiments of the present disclosure, which are illustrated in the accompanying figures. Turning to FIGS. 1-15, there are illustrated components of a bedding marketing system 20.

In one embodiment, in accordance with the principles of the present disclosure, device 05 includes a front side 35, a backside 40, a right side 25, a left side 30, a top 10 and a bottom side 20 configured to construct a box-like structure having 4 sides a top and bottom. The box-like structure having an internal chamber. The top 10 of device 05 comprises and opening that is in direct communication with the internal chamber. The opening can have a grate-like structure configured to freely allow air in and out of the cavity while keeping items from entering into the chamber. In some embodiments, top surface 10 has indicia 50 embossed on the surface providing directions on where to place the article of bedding, for example a pillow, to be tested. Additional indicia can also be written on the top surface.

As shown in FIG. 1, the 4 sides (25, 30, 35 and 40), top 10 and bottom 20 each include a body 28 defining a chamber and an opening 15 cut into top surface 10 that is in communication with the chamber of device 05. At least one air flow generator 60 is positioned either within the chamber or is external to the chamber and is connected by a conduit 45. In some embodiments, at least one of air flow generators 60 is a fan having a motor, a shaft extending from motor and a blade that is fixed to a shaft. The motor is configured to rotate the shaft in a first direction, such as, for example, clockwise and/or a second directions, such as counterclockwise. The direction of rotation of the shaft determines whether a positive air is pushed into the chamber and out the opening of the top surface 10 or a negative pressure is realized pulling air into the opening. In some embodiments, the device 05 has a uniform diameter along the entire length of device 05. In some embodiments, the device 05 and/or opening 15 may have various cross section configurations, such as, for example, circular, oval, oblong, triangular, rectangular, square, polygonal, irregular, uniform, non-uniform, variable, tubular and/or tapered.

Figure 3:
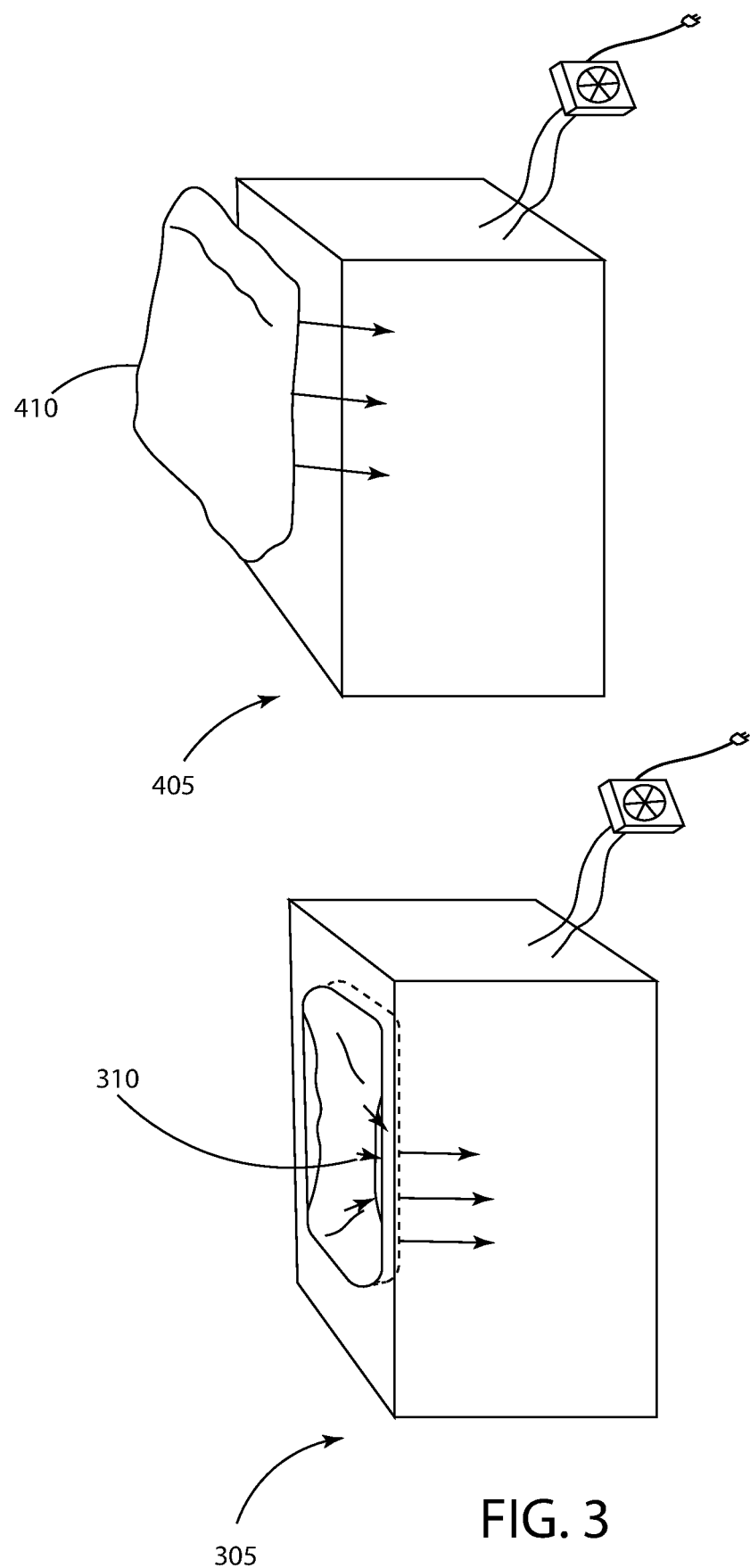
FIG. 3 is a front view of the system shown in FIG. 2 with pillows.

In some embodiments, device 05 includes a cover 18 positioned over a majority of opening 15 on the top surface 10 of device 05. The cover 18 is configured to allow air to travel in and out of the chamber while preventing larger items, such as, a pillow (55, 155, 255) form being sucked into the chamber while the pillow is being tested. The cover 18 covering opening 15 allows air flow created by air flow generator 60 to pass through the cover 18 and into the pillow placed on the cover. In some embodiments, the cover can be removed and interchanged with different and/or replacement. In some embodiments, a pillow is positioned such that an outer surface of pillow is flush with an outer surface of the cover 15, as shown in FIG. 3.

User interfaces can be electrically coupled to air flow generator 60 by a wire, wirelessly, or controlled using a downloadable app. The air flow generator 60 when turned on causes rotation of the shaft to create air flow. In some embodiments, the shaft rotates in a clockwise direction generating a positive flow of air through the cover. When the shaft in the airflow generator is reversed air is pulled into chamber causing a suction of some degree between the pillow placed on the cover. If the pillow is configured has air flow the air will flow from the opening, through the pillow and felt on the opposite side of the pillow. The greater the air permeability of the pillow the more air felt through the pillow.

In some embodiments, the rotation of the shaft can be reversed and air drawn through the pillow into the chamber. Pillows that have a greater air flow will often retain its shape as air is sucked into the pillow, as shown in FIG. 3, unit 2. For pillows that have little or no air flow, the pillow can deform and be sucked against the cover 18 on the top surface 10 of the device 05 as shown in FIG. 3, unit 1. In some embodiments, air flow created by each of air flow generator 60 has the same velocity. In some embodiments, air flow created by air flow generators 60 moves through each of pillows (55, 155, 255) at a different velocity. This can be used to show the amount of air flow through a pillow so as to maintain its shape.

In some embodiments, top surface 10 of device 05 comprises indicia 50 relating providing instructions on where to place the pillow to be tested. In some embodiments, indicia 50 is printed on a portion of device 05, such as, for example, on front side 35. In some embodiments, device 05 can have a display associated with it or incorporated into device 05, such as, for example, a display of an electrical device, such as, for example, a computer, tablet, smartphone, personal digital assistant. In some embodiments, the display that includes indicia 50 is a touchscreen. In such embodiments, the display that includes indicia 50 may be interactive such that the user can touch an icon on the touchscreen or a portion of the touchscreen to display a menu of options and/or navigate through a series of questions that will assist the user in selecting bedding material, for example. In some embodiments, the display that includes indicia 50 is not a touchscreen. In such embodiments, the display that includes indicia 50 is intended only to provide information and is not capable of changing in response to user input and/or action. In some embodiments, indicia 50 includes letters, words, characters and/or symbols that are printed on the top surface 10 or front side 35 and a display (not shown) that is incorporated into system 05. In some embodiments, indicia 50 includes a velocity at which air flows through the pillow and/or a numerical rating that corresponds to a velocity at which air flows through at least one of pillows being tested.

Figure 2:
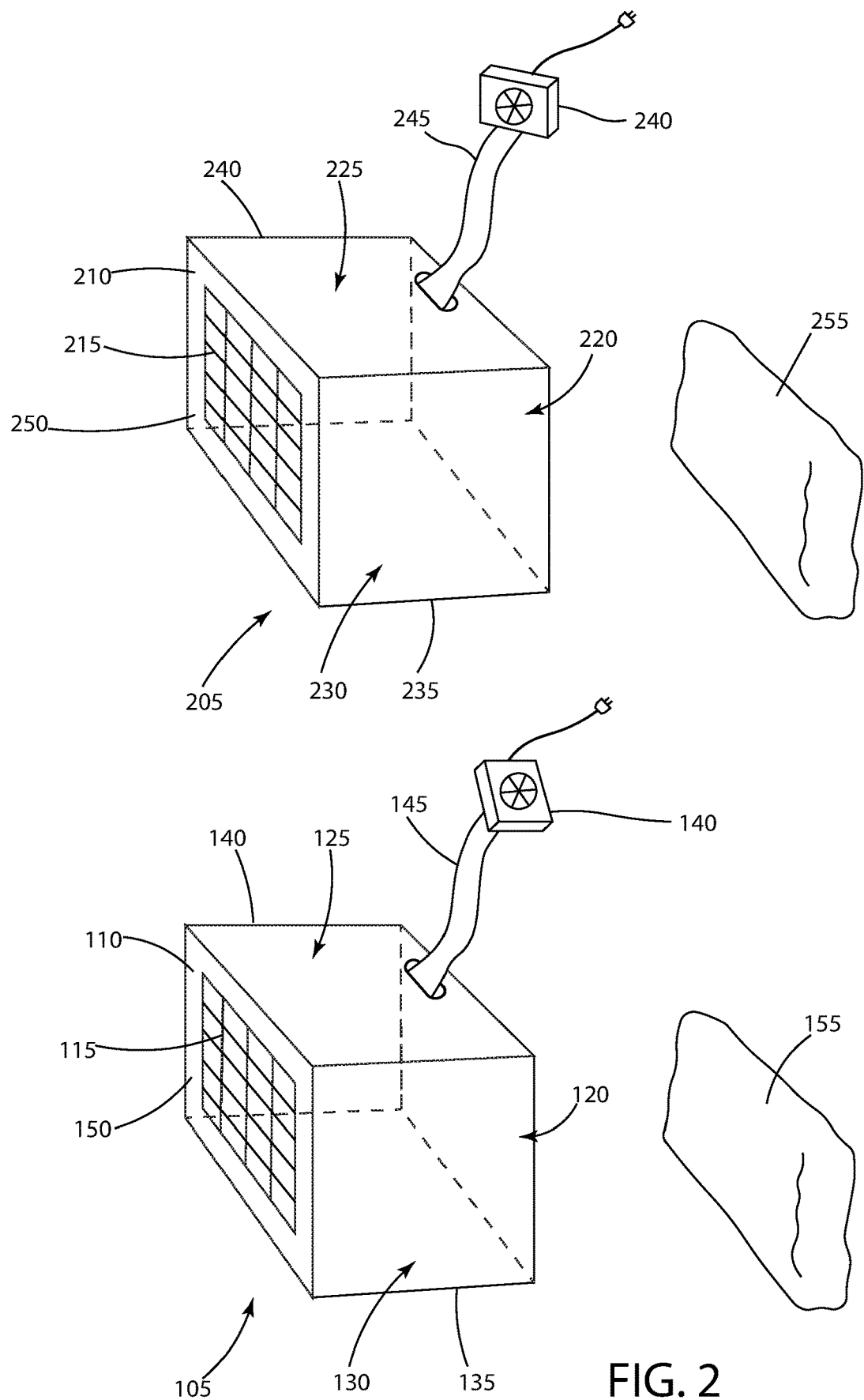
FIG. 2 is a front view of one embodiment of a system for comparing air flow through a first article an article of bedding to the air flow through a second article of bedding of the system in accordance with the principles of the present disclosure.

FIG. 2 shows a system comprising unit 1 and unit 2 that is configured to test 2 different pillows simultaneously to sow the affect on air being drawn into the chamber as shown in FIG. 3. Unit 1 of FIG. 3 shows a pillow having little to no air that passes through the pillow causing it to be deformed and sucked against the cover. This can be visually or numerically compared to the pillow placed on the top surface of unit 2. Here the pillow maintains its originally shape thereby indicating that the pillow has air flow and the air being drawn into the chamber goes through the pillow allowing it to roughly maintain its original shape.

Figure 4:
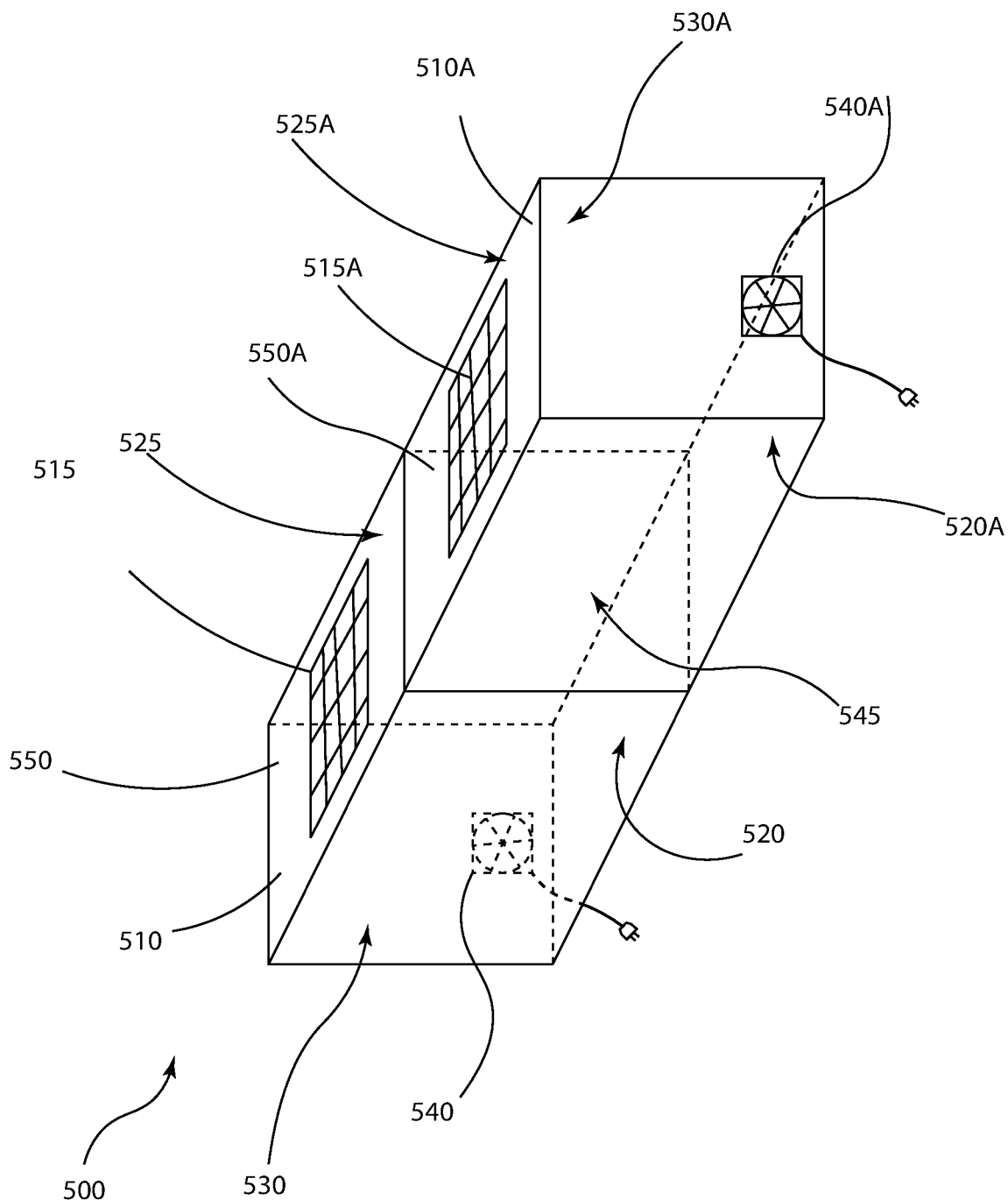
FIG. 4 is a front view of a single unit system for comparing air flow through a first article an article of bedding to the air flow through a second article of bedding of the system in accordance with the principles of the present.

FIG. 4 shows a device 500 having two separate units each having its own opening (515 and 515A) that is continuous with the chamber of unit 1 and the chamber of unit 2, respectively. The single unit separates the two chambers by a septum 545 positioned midway between the left side 530 and the right side 530A. Unit 1 and unit 2 are each equipped with their own air generators (540 and 540A) that are in fluid communication with unit 1 and unit 2 respectfully. This allows the testing of two separate pillows simultaneously to show the differ air flows side by side. Although two separate chambers are provided the device can also test pillows one at a time since each unit work independently. In some embodiments one air generator can be used to generate the airflow in device 500 thereby testing 2 pillows at one time with the activation of one air generator.

In operation and use, a user that is in the market for bedding, for example a pillow, may use the devices presented in this application to compare which pillow has the airflow characteristics that matches the users profile. The user may read indicia or the display provided to learn about different types of materials that are used to make bedding products, for example different pillows, and the role that airflow plays in selecting the correct pillow.

The user may then engage a feature on one or more of user interfaces to move one or more air flow generators from the off position to the on position. In particular, the user will place a pillow to be tested on the top surface of the device over the opening as directed by indicia (50, 150 and 250). Once positioned, the air flow generator (60, 140, 540) that is associated with the first pillow to be tested is switched from the off position to the on position. This will allow the user to feel the amount of air that flows through the first pillow. In single unit device embodiments, the air generator is taken off of the testing surface and replaced with the next pillow to be tested. Once positioned the air generator is turned back on and its affect on the pillow is examined. that are one of sample materials 42.

In some embodiments in accordance with the principles of the present disclosure that have either two separate units (FIGS. 2 and 3) or one unit with two chambers (FIG. 4), a first pillow to be tested is positioned over the opening of unit 1 and a second pillow is positioned over the opening of unit 2. Once in position the air generator for each unit is turned on and the air flow of the pillows is examined. As stated above, the more restrictive the pillow is to air flow the more the pillow will deform because of the pillow being sucked into the chamber. In embodiments that have one air generator that supplies air to both chambers, that air generator is activated once the pillow are positioned to be tested. The affects of the air flow on the pillows can either be observed visually or be measured and displayed for the buyer to choose the correct pillow.

This may be repeated with additional pillows. The user may then compare the amount of air that moves through the pillows that were tested to determine which pillow they think would be best suited to their body type, body temperature, sleep position, etc. For example, if the user has a body type wherein he or she feels warm or hot when he or she is sleeping, the user may opt to select a pillow that provides the most amount of ventilation and/or provides more ventilation than at least another one of the pillows tested. In some embodiments, one or a plurality of articles of bedding, such as, for example, one or more bed sheets, blankets, and/or mattress toppers.

In some embodiments, information provided may guide a user in using the testing device so as to select pillows that best suits the user. For example, in some embodiments, indicia may include printed instructions for using devices described above to select pillows that best suits the user. In some embodiments, the information provided may be interactive and provides the user with questions or prompts that the user can answer or select to help the user select pillows that best suits the user. In some embodiments, a display is provided that may include an electronic device, such as, for example, a touchscreen that presents a question to the user when the user approaches the device. For example, the display/touchscreen may ask the user visually and/or audibly whether the user has a high body temperature, a low body temperature, or a moderate body temperature. The user can answer the question by touching the display/touchscreen and/or speaking. For example, the user may touch a portion of the display/touchscreen that includes information about people with high body temperatures or includes language such as "high body temperature." In response the display will provide one or a plurality of sample pillows that are best adapted for people with high body temperatures. The display may also suggest sheets, mattress toppers and even mattresses that are consistent with the user information provided.

The user may then test pillows that are best adapted for people with high body temperatures in the manner discussed above. This will allow the user to see and feel the amount of air that flows through the pillows selected compare the amount of air that moves through the pillows that were tested to determine which of the pillows tested they think would be best suited for them. The user may then select an article of bedding and test it as described above to make a bedding selection that best fits the users profile.

Figure 9:
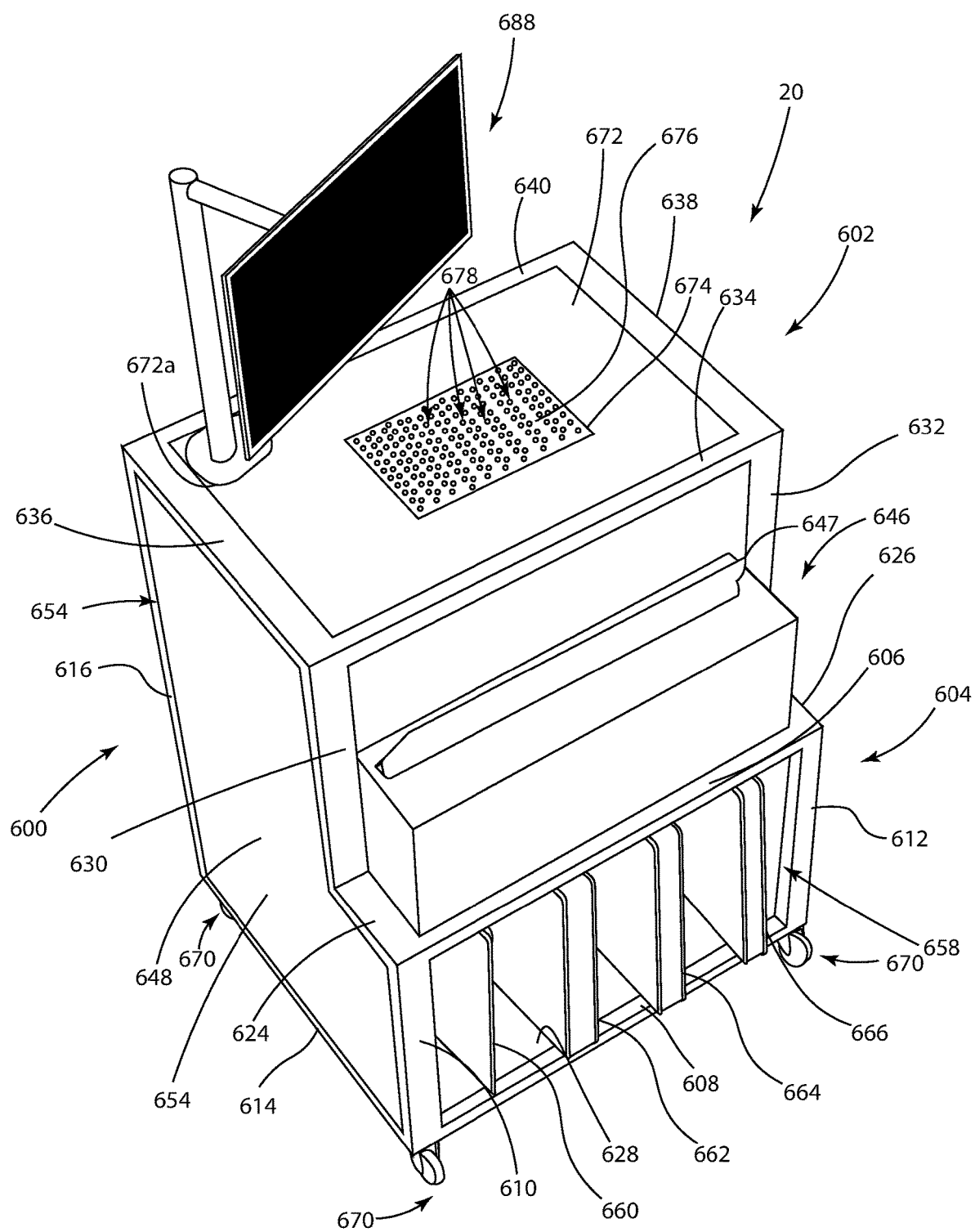
FIG. 9 is a perspective view of the test station shown in FIG. 5.
Figure 10:
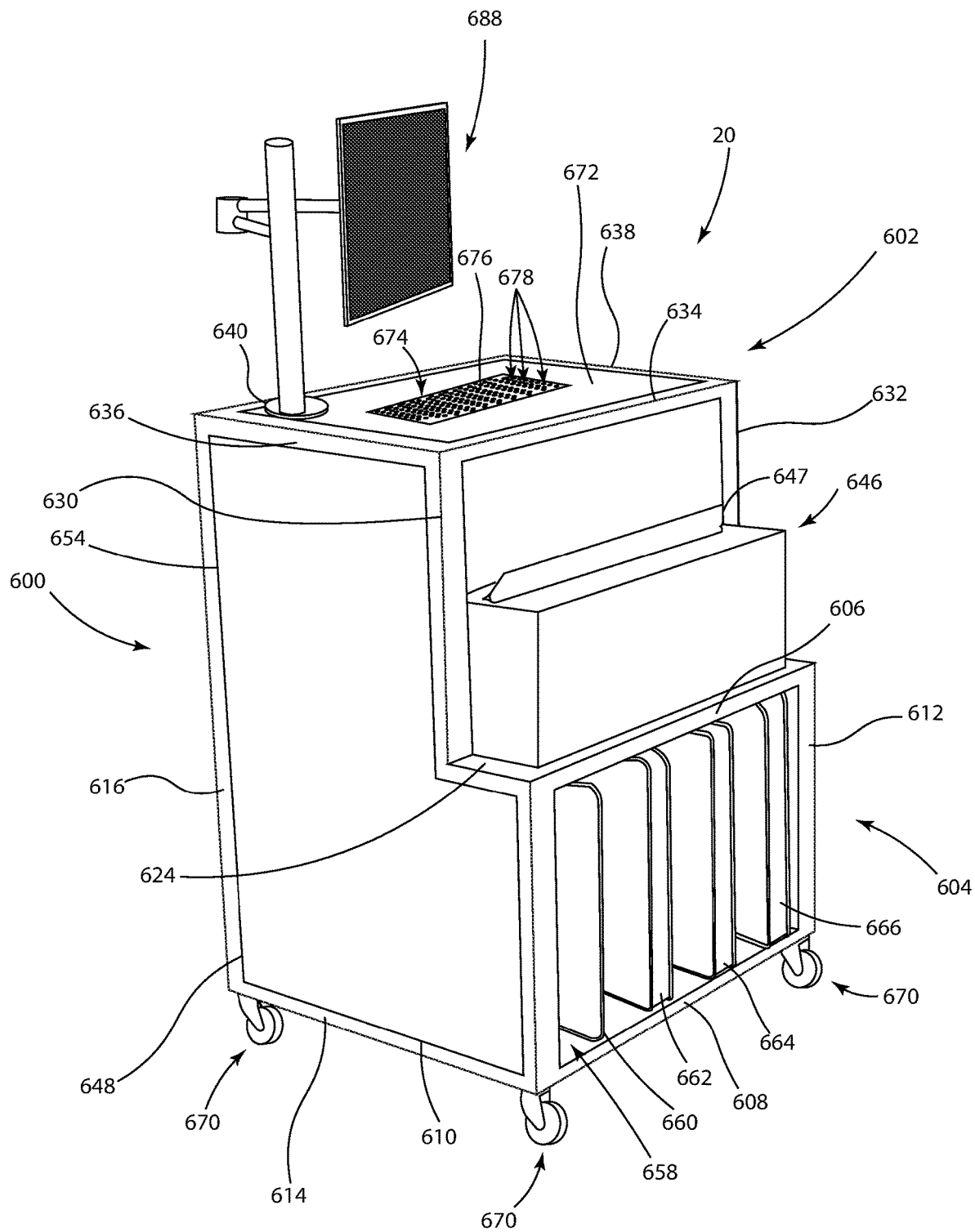
FIG. 10 is a perspective view of the test station shown in FIG. 5.

In one embodiment, shown in FIGS. 5-15, bedding marketing system 20 includes a cart 600 having a top portion 602 and a bottom portion 604. Portion 604 includes spaced apart horizontal rails 606, 608. Rail 606 extends parallel to rail 608 in a first vertical plane. Rails 606, 608 each extend from a vertical rail 610 to a vertical rail 612 that extends parallel to rail 610 in the first vertical plane. Portion 604 includes a horizontal rail 614 that extends from rail 610 to a vertical rail 616, as shown in FIG. 9, for example. Portion 604 includes a horizontal rail 618 opposite rail 614 that extends from rail 612 to a vertical rail 620. Rail 618 extends parallel to rail 614 in a first horizontal plane. Rail 616 is connected to rail 620 by a horizontal rail 622 that extends from rail 616 to rail 620. Rail 620 extends parallel to rail 616 in a second vertical plane. Portion 604 includes horizontal rails 624, 626 that are spaced apart from one another by rail 606. Rail 626 extends parallel to rail 624 in a second horizontal plane. Rail 624 extends from rail 610 to rail 916 and rail 626 extends from rail 612 to rail 620. In some embodiments, portion 604 includes a tray, such as, for example, a bottom wall 628 that from rail 614 to rail 618 and from rail 608 to rail 622. In some embodiments, at least one of rails 610, 612, 614, 616, 618, 620, 622, 624, 624, 626 has a rectangular cross-sectional configuration. In some embodiments, at least one of rails 610, 612, 614, 616, 618, 620, 622, 624, 624, 626 may have various cross section configurations, such as, for example, oval, oblong, triangular, square, polygonal, irregular, uniform, non-uniform, variable, tubular and/or tapered. In some embodiments, rails 610, 612, 614, 616, 618, 620, 622, 624, 624, 626 are permanently fixed relative to one another such that one of rails 610, 612, 614, 616, 618, 620, 622, 624, 624, 626 cannot be moved relative to another one of rails 610, 612, 614, 616, 618, 620, 622, 624, 624, 626 without breaking at least one of rails 610, 612, 614, 616, 618, 620, 622, 624, 624, 626. In some embodiments, cart 600 is the same or similar to the cart disclosed in U.S. patent application Ser. No. 16/038,791, filed Jul. 18, 2018, which is expressly incorporated herein by reference, in its entirety.

Portion 602 includes spaced apart vertical rails 630, 632. Rail 632 extends parallel to rail 630 in a third vertical plane. Rail 630 is positioned between rail 610 and rail 616 and extends from rail 624 to a horizontal rail 634. Rail 632 is positioned between rail 612 and rail 620 and extends from rail 626 to rail 634. Rail 634 extends from a horizontal rail 636 to a horizontal rail 638. Rail 638 extends parallel to rail 636 in a third horizontal plane and is spaced apart from rail 636 by rail 634. Rail 630 is permanently fixed relative to rail 624 such that rail 630 cannot be removed from rail 624 without breaking rail 624 or rail 630. Rail 632 is permanently fixed relative to rail 626 such that rail 632 cannot be removed from rail 626 without breaking rail 626 or rail 632. A horizontal rail 640 extends from rail 636 to rail 638 and from rail 616 to rail 620. Rail 640 extends parallel to rail 634 in the third horizontal plane. In some embodiments, at least one of rails 630, 632, 634, 636, 638, 640 has a rectangular cross-sectional configuration. In some embodiments, at least one of rails 630, 632, 634, 636, 638, 640 may have various cross section configurations, such as, for example, oval, oblong, triangular, square, polygonal, irregular, uniform, non-uniform, variable, tubular and/or tapered. In some embodiments, rails 630, 632, 634, 636, 638, 640 are permanently fixed relative to one another such that one of rails 630, 632, 634, 636, 638, 640 cannot be moved relative to another one of rails 630, 632, 634, 636, 638, 640 without breaking at least one of rails 630, 632, 634, 636, 638, 640.

In some embodiments, portion 602 includes a wall, such as, for example, a panel 642 that extends from rail 630 to rail 632 and from rail 634 to portion 604. In some embodiments, portion 604 includes a wall, such as, for example, a panel 644 that extends from rail 624 to rail 626 and from rail 606 to panel 644. In some embodiments, a panel 644 that extends from rail 624 to rail 626 and from rail 606 to rails 616, 620. Panel 644 defines a ledge configured to support a dispenser 646, as discussed herein. In some embodiments, dispenser 646 is configured to dispense pillow napkins 647 and includes one or more components disclosed in U.S. Pat. No. 9,895,010, which is expressly incorporated by reference herein, in its entirety. In some embodiments, cart 600 includes a wall, such as, for example, a panel 648 that extends from rail 610 to rail 616, from rail 614 to rail 624 and from rail 614 to rail 636. In some embodiments, cart 600 includes a wall, such as, for example, a panel 650 opposite panel 648. Panel 650 extends from rail 612 to rail 620, from rail 618 to rail 626 and from rail 618 to rail 638. In some embodiments, cart 600 includes a wall, such as, for example, a panel 652 that extends from rail 616 to rail 620 and from rail 622 to rail 640. In some embodiments, at least one of panels 642, 644, 648, 650, 652 includes indicia, such as, for example, indicia 654 shown in FIG. 8. In some embodiments, indicia 654 provides instructions on where to place a test article, such as, for example, a pillow 656 on cart 600. In some embodiments, indicia 654 can include a menu of options and/or questions that will assist the user in selecting bedding material, for example. In some embodiments, indicia 654 can include directions for using dispenser 646. In some embodiments, indicia 654 can include directions for testing pillow 656 using cart 600. In some embodiments, indicia 654 can include information about pillow 656 and/or other articles of bedding.

A top surface of wall 628 and inner surfaces of panels 644, 648, 650, 654 define a cavity 658 configured for disposal of one or a plurality of test articles, such as, for example, pillows 660, 662, 664, 666. It is envisioned that cavity 658 can be adapted to fit any number of pillows. That is, cavity 658 can be adapted to fit a selected number of pillows in addition to pillows 660, 662, 664, 666. In some embodiments, cart 600 includes a plurality of spaced apart wire dividers 668. Pillows 660, 662, 664, 666 are each configured for positioning between adjacent dividers 668 to maintain pillows 660, 662, 664, 666 in a vertical orientation within cavity 658. In some embodiments, threaded distal ends of dividers 668 extend through a thickness of wall 628 and are secured to wall 628 by threading nuts onto the threaded distal ends of dividers 668. In some embodiments, at least one of pillows 656, 660, 662, 664, 666 are the same or similar to one of the pillows disclosed in U.S. Pat. No. 8,646,134, which is expressly incorporated herein by reference, in its entirety.

Figure 5:
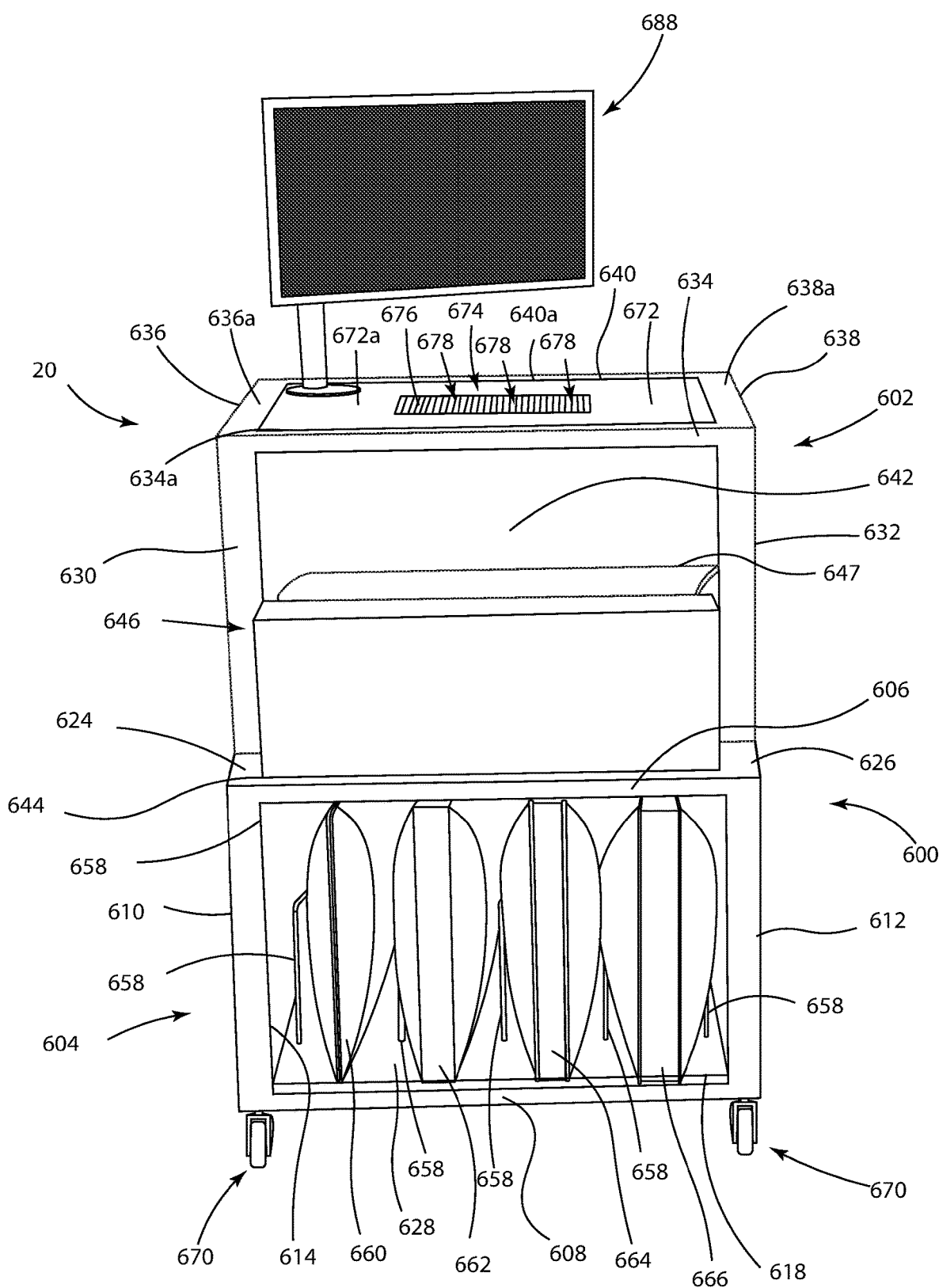
FIG. 5 is a perspective view of one embodiment of a test station, in accordance with the principles of the present disclosure.
Figure 6:
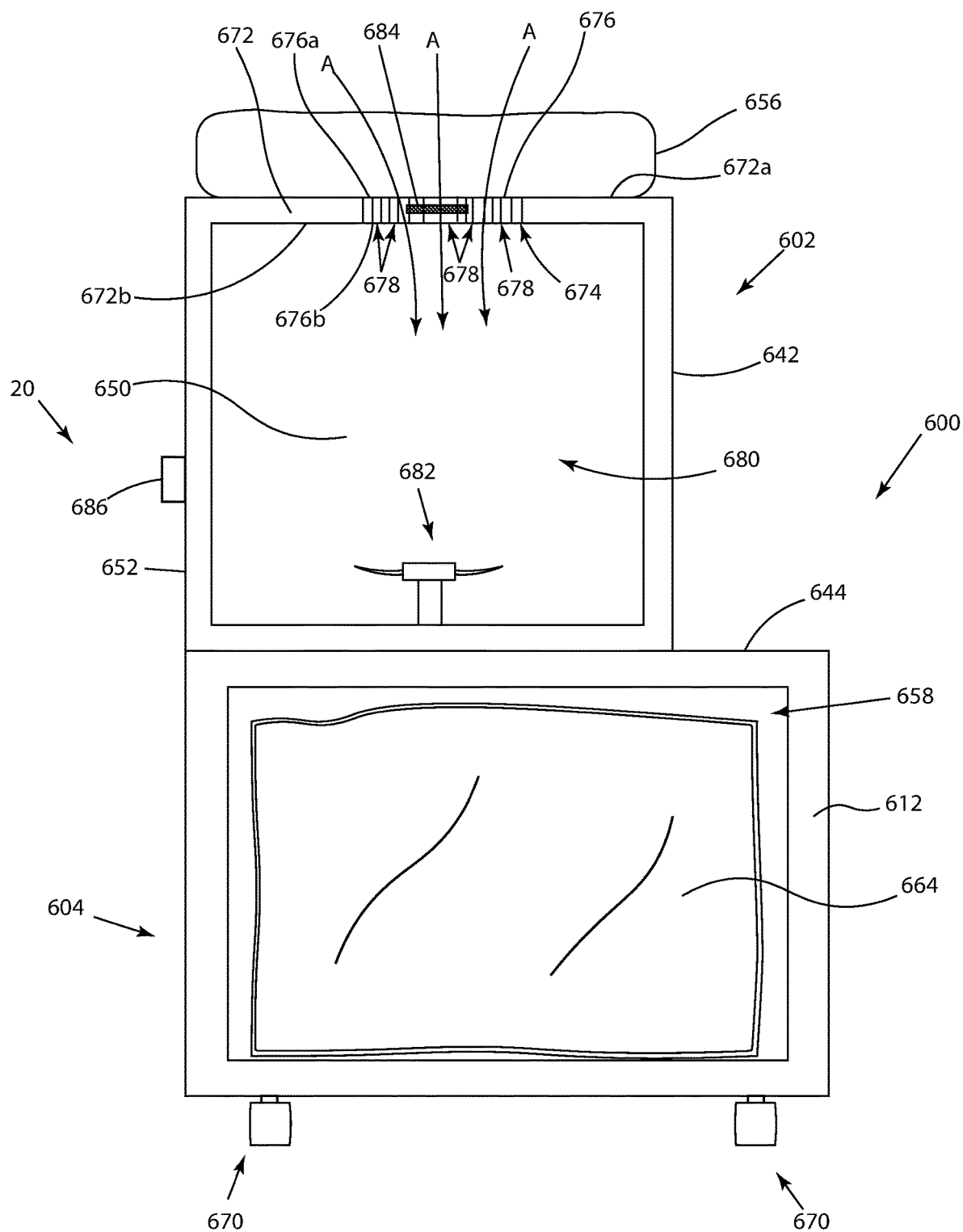
FIG. 6 is a side, cross-sectional view of one embodiment of the test station shown in FIG. 5, in accordance with the principles of the present disclosure.
Figure 7:
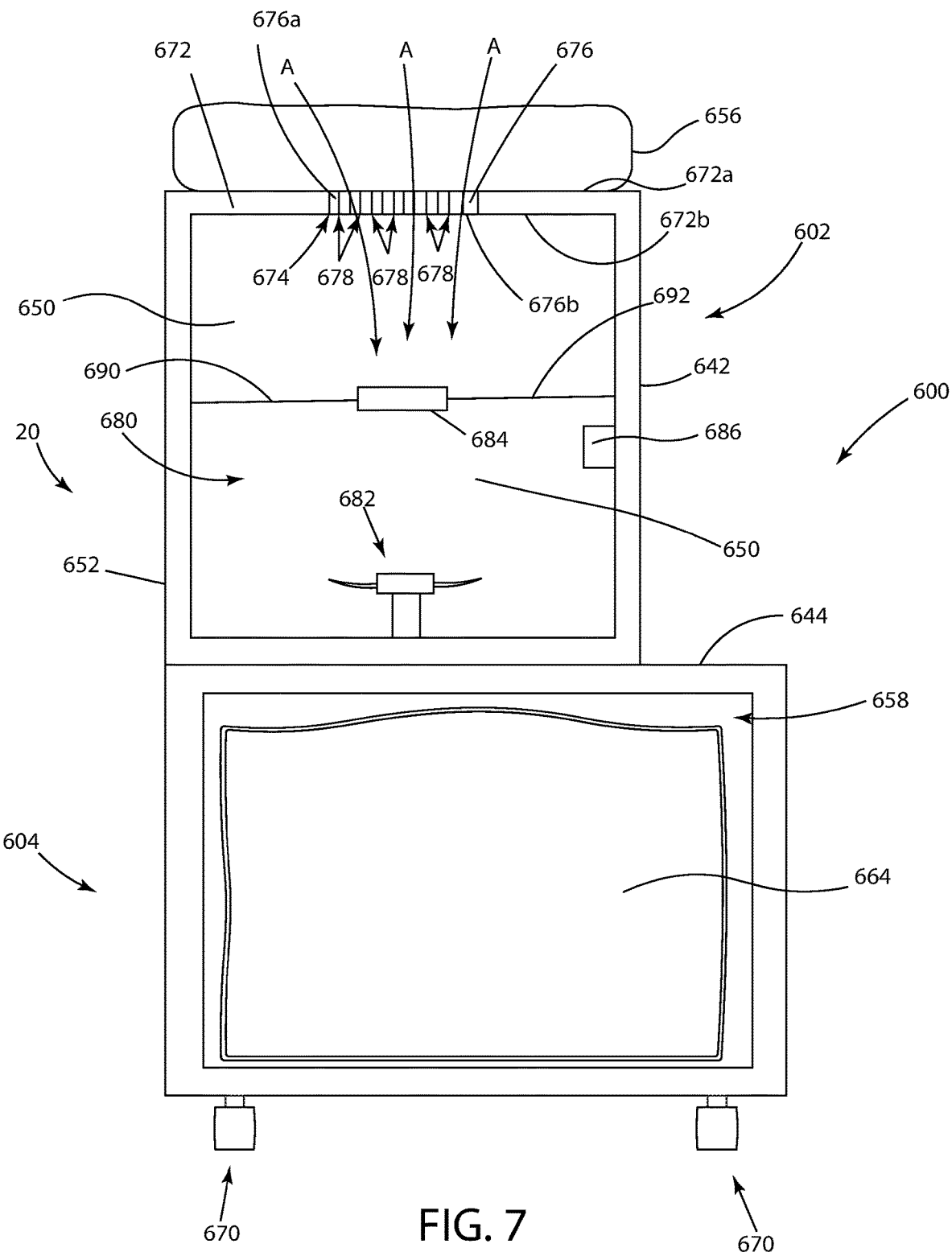
FIG. 7 is a side, cross-sectional view of one embodiment of the test station shown in FIG. 5, in accordance with the principles of the present disclosure.
Figure 8:
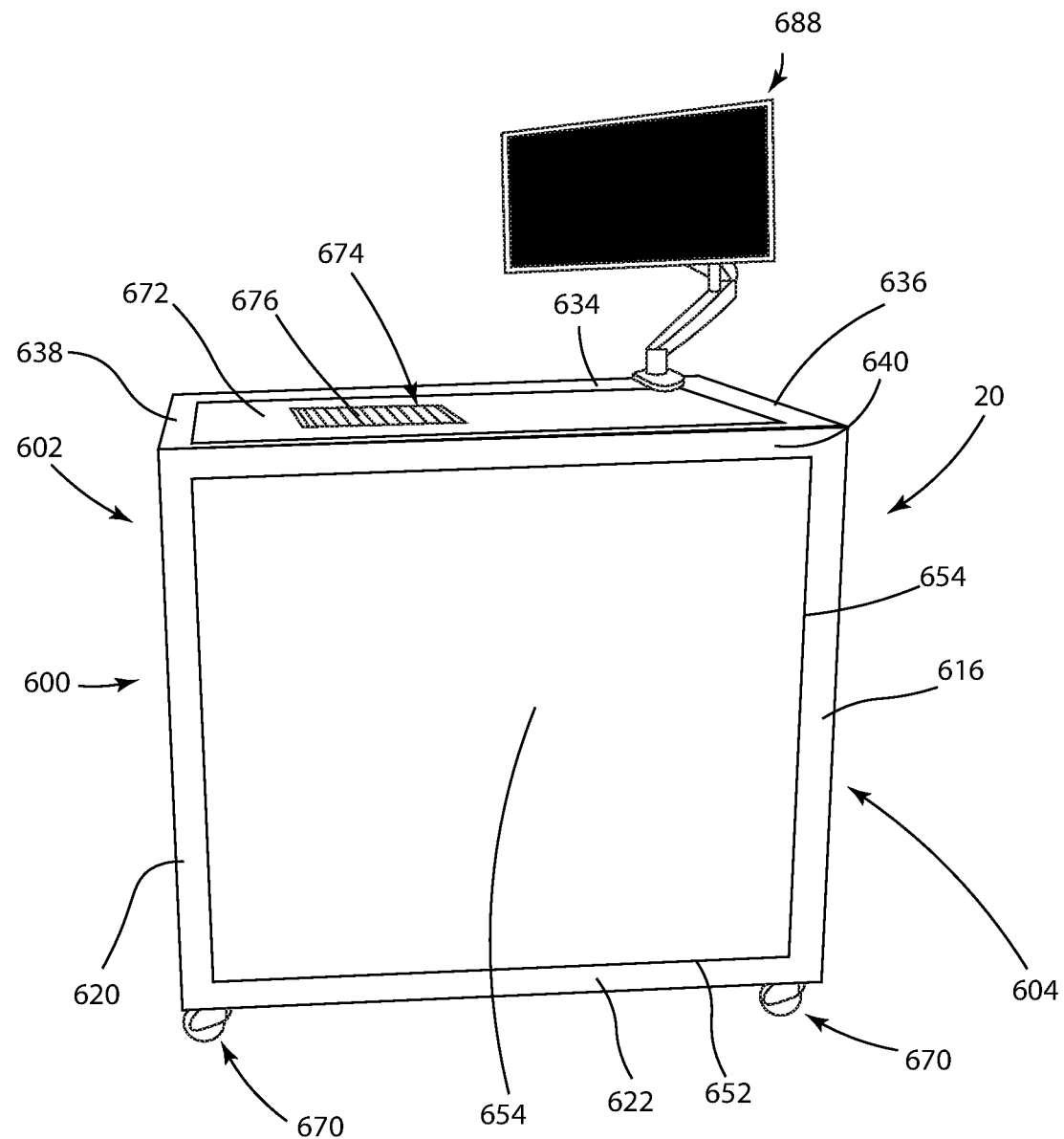
FIG. 8 is a perspective view of the test station shown in FIG. 5.

In some embodiments, cart 600 is configured to be fixed to a surface, such as, for example a floor of a building. In such embodiments, one or more of rails 608, 614, 618, 622 may include one or a plurality of holes that extend through thicknesses of rails 608, 614, 618, 622 such that bolts or other fastening devices can be inserted through the holes in rails 608, 614, 618, 622 such that the bolts extend into the floor to fix cart 600 relative to the floor. In some embodiments, cart 600 is configured to be movable and includes casters 670 that are coupled to distal ends of each of rails 610, 612, 616, 620, as shown in FIGS. 6 and 7. In some embodiments, cart 600 is configured to be movable and includes a first pair of casters 670 that are positioned between rails 610, 616 as shown in FIGS. 5 and 8-10, and a second pair of casters 670 that are positioned between rails 612, 620.

Portion 602 includes a panel, such as, for example, a top wall 672 that extends from rail 636 to rail 638 and from rail 634 to rail 640. In some embodiments, wall 672 is coupled to rails 634, 636, 638, 640 such that a top surface 672a of wall 672 is flush with top surfaces 634a, 636a, 638a, 640a of rails 634, 636, 638, 640 to provide a surface suitable for supporting one or more of pillows 656, 660, 662, 664, 666, as discussed herein. Wall 672 has a solid configuration that is free of any holes, gaps, apertures, etc. that extend through a thickness of wall 672 such that wall 672 prevents air and/or moisture from moving through the thickness of wall 672. That is, air and/or moisture adjacent to surface 672a of wall 672 is prevented from moving through an opposite bottom surface 672b of wall 672. Wall 672 defines an opening 674 extending continuously through surface 672a and surface 672b such that opening 674 extends through the thickness of wall 672. A grate 676 is positioned in opening 674. In some embodiments, grate 676 is positioned in opening 674 such that a top surface 676a of grate 676 is flush with surface 672a and an opposite bottom surface 676b of grate 676 is flush with surface 672b, as shown in FIGS. 5 and 6, for example. Grate 676 includes a plurality of spaced apart holes 678 that each extend through a thickness of grate 676 defined by the distance between surface 676a and surface 676b. In some embodiments, opening 674 and/or grate 675 may be variously shaped, such as, for example, circular, oval, oblong, triangular, square, rectangular, polygonal, irregular, uniform, non-uniform, offset, staggered, undulating, arcuate, variable and/or tapered. In some embodiments, holes 678 may have various cross section configurations, such as, for example, circular, oval, oblong, triangular, rectangular, square, polygonal, irregular, uniform, non-uniform, variable and/or tapered.

Inner surfaces of panels 642, 650, 652 and surface 672b define an interior chamber 680, as best shown in FIGS. 6 and 7, for example. Chamber 680 is spaced apart from cavity 658 such that cavity 658 is not in communication with chamber 680. In some embodiments, the panels and/or rails that define chamber 680 are free of any free of any holes, gaps, apertures, etc. such that the only openings in cart 600 that are in communication with chamber 680 are holes 678. That is, the only place air and/or moisture within chamber 680 can exit chamber 680 is through holes 678. Likewise, the only place air and/or moisture outside of chamber 680 can enter chamber 680 is through holes 678.

An air flow generator 682 is positioned within chamber 680, as best shown in FIGS. 6 and 7, for example. In some embodiments, air flow generator 682 is configured to generate negative pressure to draw air and/or moisture A through a test article, such as, for example, one of pillows 656, 660, 662, 664, 666 and holes 678 and into chamber 680, as shown in FIGS. 6 and 7. In some embodiments, air flow generator 682 is positioned directly below grate 676 such that air flow generator 682 is coaxial with grate 676. In some embodiments, air flow generator 682 is positioned directly below grate 676 such that at least a portion of air flow generator 682 is coaxial with at least one of holes 678. It is envisioned that air flow generator 682 may also be positioned outside of chamber 680 and is connected to cart 600 by a conduit, such as, for example, conduit 45 that is in communication with chamber 680. In some embodiments, air flow generator 682 is a fan. In some embodiments, air flow generator 682 is an air pump.

Cart 600 includes one or a plurality of sensors, such as, for example, one or a plurality of pressure sensors 684 that are configured to measure the pressure imposed by air and/or moisture A as air and/or moisture A moves through one of pillows 656, 660, 662, 664, 666 by generating a signal as a function of the pressure imposed, for example. Sensor 684 is configured to generate a pressure value (in pounds per square inch, for example) corresponding to the pressure imposed by air and/or moisture A as air and/or moisture A moves through one of pillows 656, 660, 662, 664, 666. In one embodiment, sensor 684 is positioned between surfaces 676a, 676b such that sensor 684 is oriented within a thickness of grate 676 and extends across at least one of holes 678, as shown in FIG. 6. This allows sensor 684 to measure the pressure imposed by air and/or moisture A as air and/or moisture A moves through one of pillows 656, 660, 662, 664, 666.

A reader, such as, for example, a processor 686 is in communication with sensor 684 and is configured to convert the pressure value generated by sensor 684 to an air flow value (in cubic feet per minute, for example). In some embodiments, processor 686 converts the pressure value generated by sensor 684 to the air flow value using an algorithm. In some embodiments, processor 686 converts the pressure value generated by sensor 684 to the air flow value using a correlation curve created by correlating known air flow values to pressure values. In some embodiments, processor 686 is wired directly to sensor 684. In some embodiments, processor 686 is in wireless communication with sensor 684. In some embodiments, processor 686 is positioned outside of chamber 680, as shown in FIG. 6. In some embodiments, processor 686 is positioned within chamber 680, as shown in FIG. 7. In some embodiments, processor 686 is part of a computer, tablet, laptop, smart phone, etc. that is separate from cart 600. Processor 686 is in wired or wireless communication with a display, such as, for example, display 688 to provide a visual representation of the air flow value determined by processor 686. In some embodiments, display 688 is coupled directly to cart. In some embodiments, display 688 is part of a computer, tablet, laptop, smart phone, etc. that is separate from cart 600.

In one embodiment, sensor 684 is positioned between grate 676 and air flow generator 682 such that sensor 684 is spaced apart from both grate 676 and air flow generator 682, as shown in FIG. 7. Sensor 684 is connected to panel 652 by a bracket 690 and is connected to panel 642 by a bracket 692. This allows sensor 684 to be positioned directly above air flow generator 682 such that sensor 684 is coaxial with air flow generator 682 to allow sensor 684 to measure the pressure imposed by air and/or moisture A as air and/or moisture A moves through one of pillows 656, 660, 662, 664, 666 and into chamber 680 through holes 678.

Figure 11:
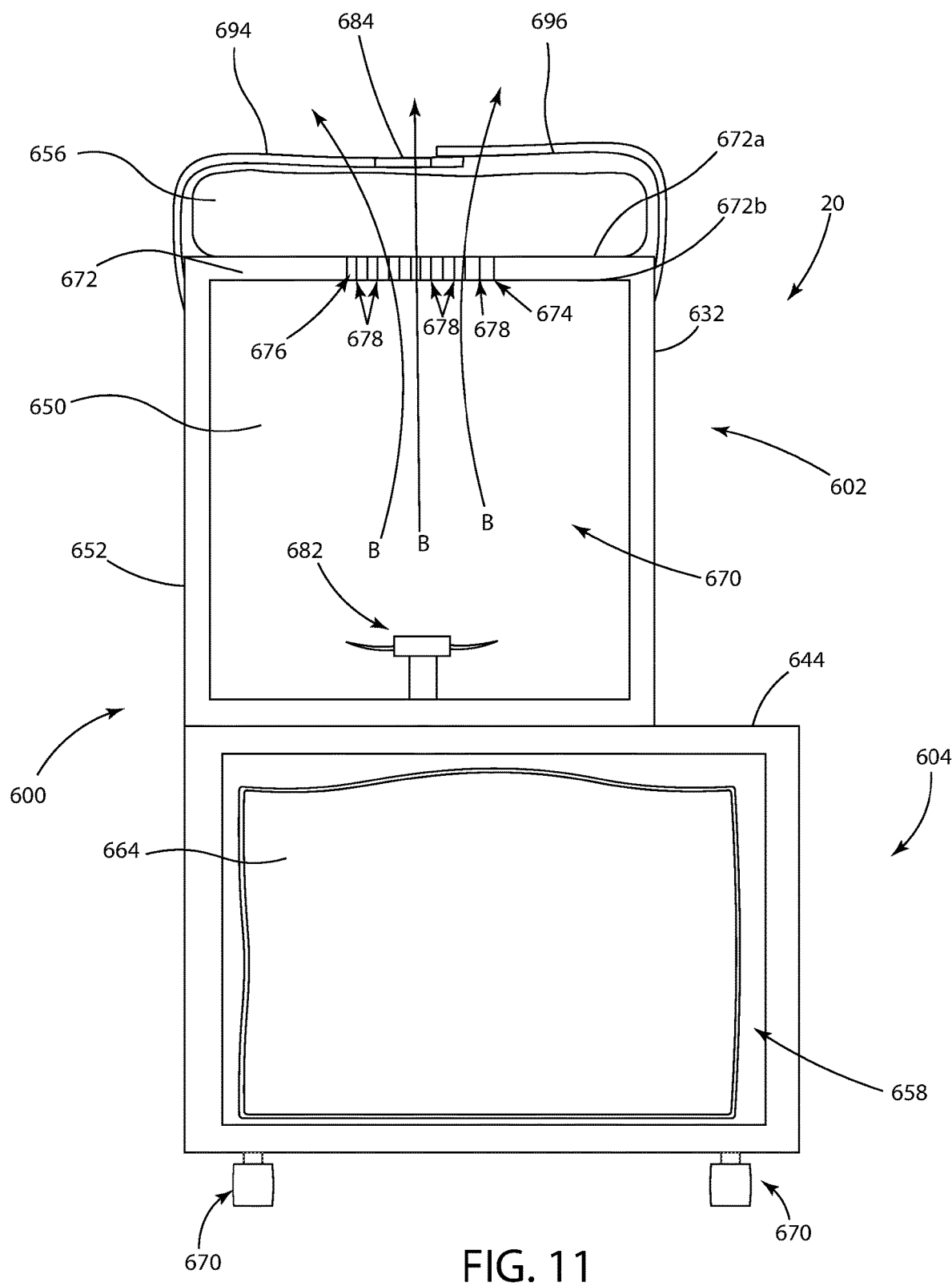
FIG. 11 is a side, cross-sectional view of one embodiment of the test station shown in FIG. 5, in accordance with the principles of the present disclosure.
Figure 12:
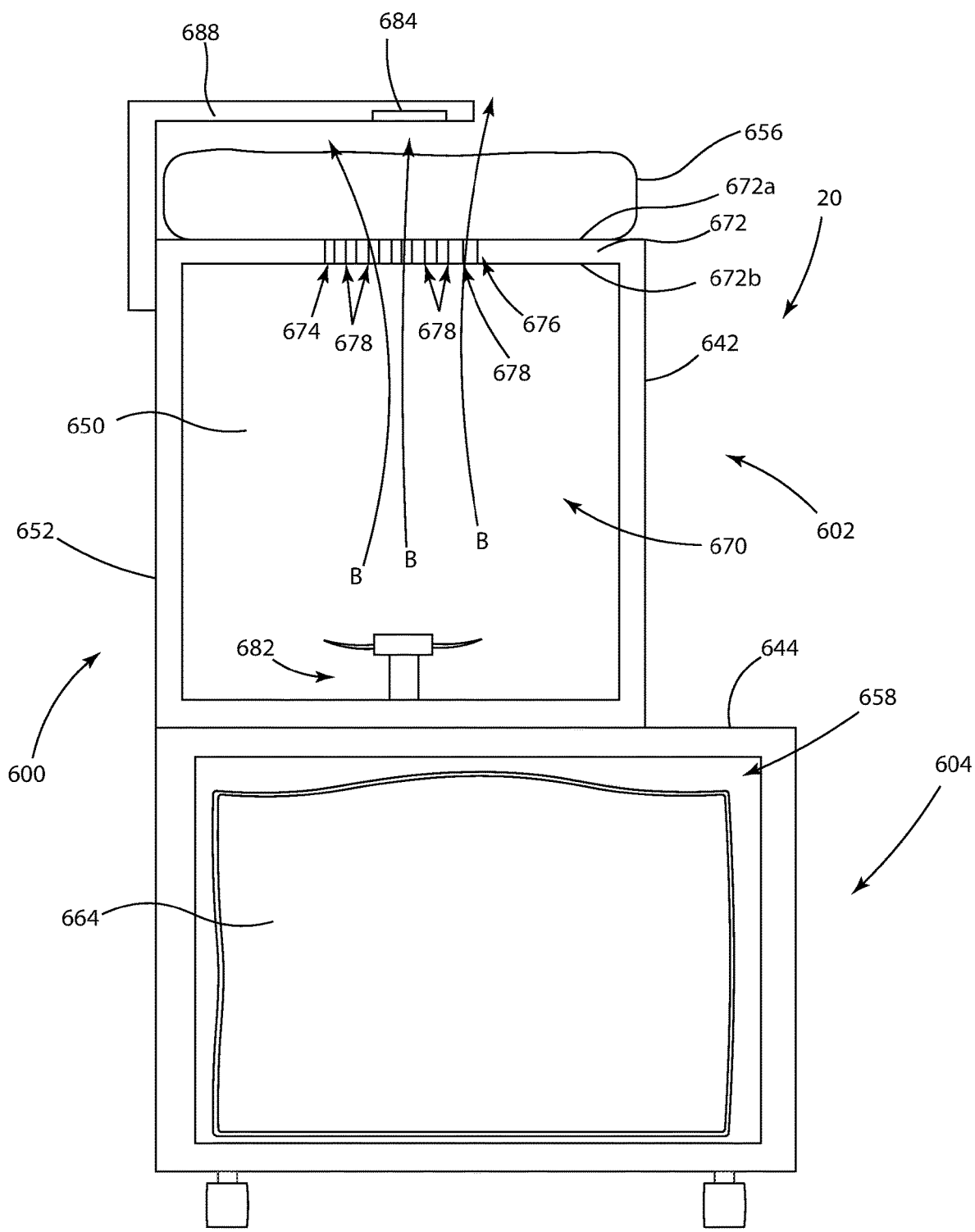
FIG. 12 is a side, cross-sectional view of one embodiment of the test station shown in FIG. 5, in accordance with the principles of the present disclosure.

In some embodiments, air flow generator 682 is configured to generate positive pressure to direct air and/or moisture B within chamber 680 through holes 678 and a test article, such as, for example, one of pillows 656, 660, 662, 664, 666, as shown in FIGS. 11 and 12. In one embodiment, cart 600 includes a first strap 694 and a second strap 696 that is configured to removably engage strap 694 to secure one of pillows 656, 660, 662, 664, 666 to cart 600, as shown in FIG. 11. Sensor 684 is coupled to one of straps 694, 696 to allow sensor 684 to measure the pressure imposed by air and/or moisture B as air and/or moisture B moves through one of pillows 656, 660, 662, 664, 666. In some embodiments, strap 696 can be coupled to strap 694 by Velcro, threads, mutual grooves, screws, adhesive, nails, barbs, raised elements, spikes, clips, snaps, friction fittings, compressive fittings, expanding rivets, staples, fixation plates, key/keyslot, tongue in groove, dovetail, magnetic connection and/or posts.

In one embodiment, cart 600 includes an arm 698 that extends over grate 676, as shown in FIG. 12. Sensor 684 is coupled to arm 698 such that sensor 684 is positioned over one of pillows 656, 660, 662, 664, 666 to allow sensor 684 to measure the pressure imposed by air and/or moisture B as air and/or moisture B moves through one of pillows 656, 660, 662, 664, 666. In some embodiments, arm 698 is permanently fixed to cart 600 such that arm 698 cannot be removed from cart 600 without breaking arm 698 and/or cart 600. In some embodiments, arm 698 is rotatable relative to cart 600 to allow the position of sensor 684 relative to grate 676 to be adjusted. For example, arm 698 may be rotatable relative to cart 600 to rotate arm 698 from an orientation in which sensor 684 is offset from grate 676 to an orientation in which sensor 684 is positioned directly over and/or is coaxial with grate 676. In some embodiments, arm 698 is configured to translate axially relative to cart 600 to adjust the distance between grate 676 and arm 698 to accommodate test articles having different thicknesses. For example, when a thick test article is being tested, arm 698 may be translated axially relative to grate 676 to increase the distance between grate 676 and arm 698 to accommodate positioning of the thicker test article between grate 676 and arm 698.

In operation and use, a first test article, such as, for example, one of pillows 656, 660, 662, 664, 666 is positioned on wall 672 such that the first test article covers at least a portion of grate 676. Air flow generator 682 is moved from an off position to an on position such that air flow generator 682 creates negative pressure that draws air and/or moisture A through the first test article and holes 678 and into chamber 680. Sensor 684 measures the pressure imposed by air and/or moisture A as air and/or moisture A moves through the first test article. Sensor 684 sends a signal to processor 686 representative of a pressure value (in pounds per square inch, for example) measured by sensor 684. Processor 686 converts the pressure value into to an air flow value (in cubic feet per minute, for example). Processor 686 then communicates with display 688 to provide a graphical representation of the air flow value on display 688. For example, in one embodiment, the air flow value is shown on display 688 using numbers and/or letters (10.0 cubic feet per minute (cfm)). In one embodiment, the air flow value is shown on display 688 using colors wherein different colors represent different air flow values. In one embodiment, the air flow value is shown on display 688 on a scale, such as, for example, a scale of one to ten, wherein numbers of the scale represent different air flow values. Display 688 thus provides a graphical representation of the air flow value associated with the first test article.

In some embodiments, air flow generator is moved from the on position to the off position and the test article is removed from cart 600. A second test article, such as, for example, another one of pillows 656, 660, 662, 664, 666 is positioned on wall 672 such that the second test article covers at least a portion of grate 676. Air flow generator 682 is moved from the off position to the on position such that air flow generator 682 creates negative pressure that draws air and/or moisture A through the second test article and holes 678 and into chamber 680. Sensor 684 measures the pressure imposed by air and/or moisture A as air and/or moisture A moves through the second test article. Sensor 684 sends a signal to processor 686 representative of a pressure value (in pounds per square inch, for example) measured by sensor 684 for the second test article. Processor 686 converts the pressure value for the second test article into to an air flow value (in cubic feet per minute, for example) for the second test article. Processor 686 then communicates with display 688 to provide a graphical representation of the air flow value for the second test article on display 688. In some embodiments, display 688 simultaneously displays the air flow value associated with the first test article and the air flow value associated with the second test article so that a tester may compare the two air flow values. The tester may select for purchase the test article having the air flow value that is closest to a desired air flow value. For example, if the tester desires a pillow that permits a high amount of air flow through the pillow to provide a cool sleeping surface, the tester may select for purchase the test article having the higher air flow value.

In some embodiments, the tester may test one or a plurality of test articles in addition to the first test article and the second test article, in the same manner the first and second test articles were tested. Display 688 may be configured to simultaneously displays the air flow value associated with the first test article, the air flow value associated with the second test article, and the air flow value(s) associated with any additional test articles so that a tester may compare the air flow values of the various test articles. The tester may select for purchase the test article having the air flow value that is closest to a desired air flow value.

In some embodiments, a first test article, such as, for example, one of pillows 656, 660, 662, 664, 666 is positioned on wall 672 such that the first test article covers at least a portion of grate 676. Air flow generator 682 is moved from an off position to an on position such that air flow generator 682 creates positive pressure that moves air and/or moisture B within chamber 670 through holes 678 and the first test article. Sensor 684 measures the pressure imposed by air and/or moisture B as air and/or moisture B moves through the first test article. Sensor 684 sends a signal to processor 686 representative of a pressure value (in pounds per square inch, for example) measured by sensor 684. Processor 686 converts the pressure value into to an air flow value (in cubic feet per minute, for example). Processor 686 then communicates with display 688 to provide a graphical representation of the air flow value on display 688.

In some embodiments, air flow generator is moved from the on position to the off position and the test article is removed from cart 600. A second test article, such as, for example, another one of pillows 656, 660, 662, 664, 666 is positioned on wall 672 such that the second test article covers at least a portion of grate 676. Air flow generator 682 is moved from the off position to the on position such that air flow generator 682 creates positive pressure that moves air and/or moisture B in chamber 670 through holes 678 and the second test article. Sensor 684 measures the pressure imposed by air and/or moisture B as air and/or moisture B moves through the second test article. Sensor 684 sends a signal to processor 686 representative of a pressure value (in pounds per square inch, for example) measured by sensor 684 for the second test article. Processor 686 converts the pressure value for the second test article into to an air flow value (in cubic feet per minute, for example) for the second test article. Processor 686 then communicates with display 688 to provide a graphical representation of the air flow value for the second test article on display 688. In some embodiments, display 688 simultaneously displays the air flow value associated with the first test article and the air flow value associated with the second test article so that a tester may compare the two air flow values. The tester may select for purchase the test article having the air flow value that is closest to a desired air flow value.

Figure 13:
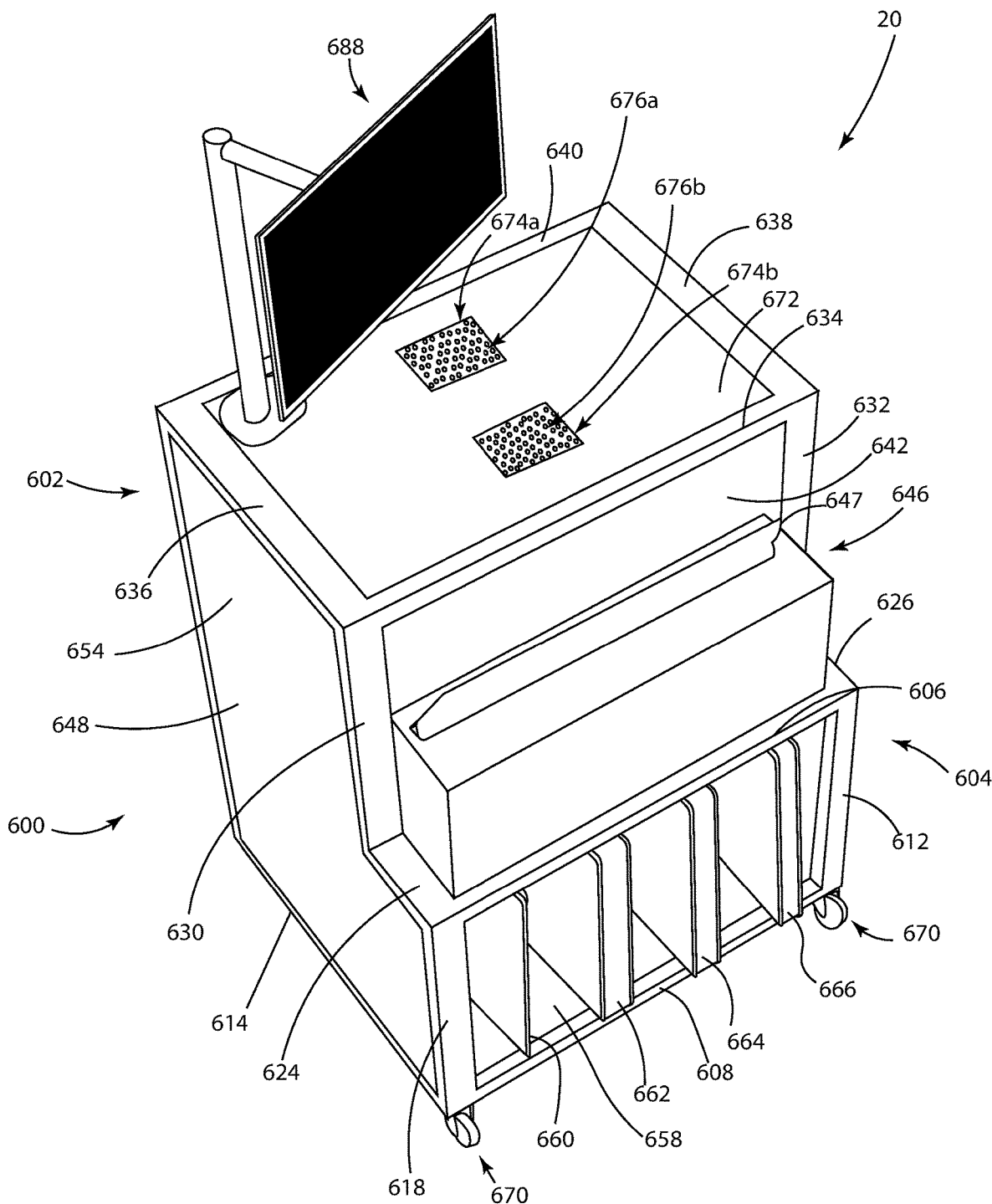
FIG. 13 is a perspective view of one embodiment of the test station shown in FIG. 5, in accordance with the principles of the present disclosure.
Figure 14:
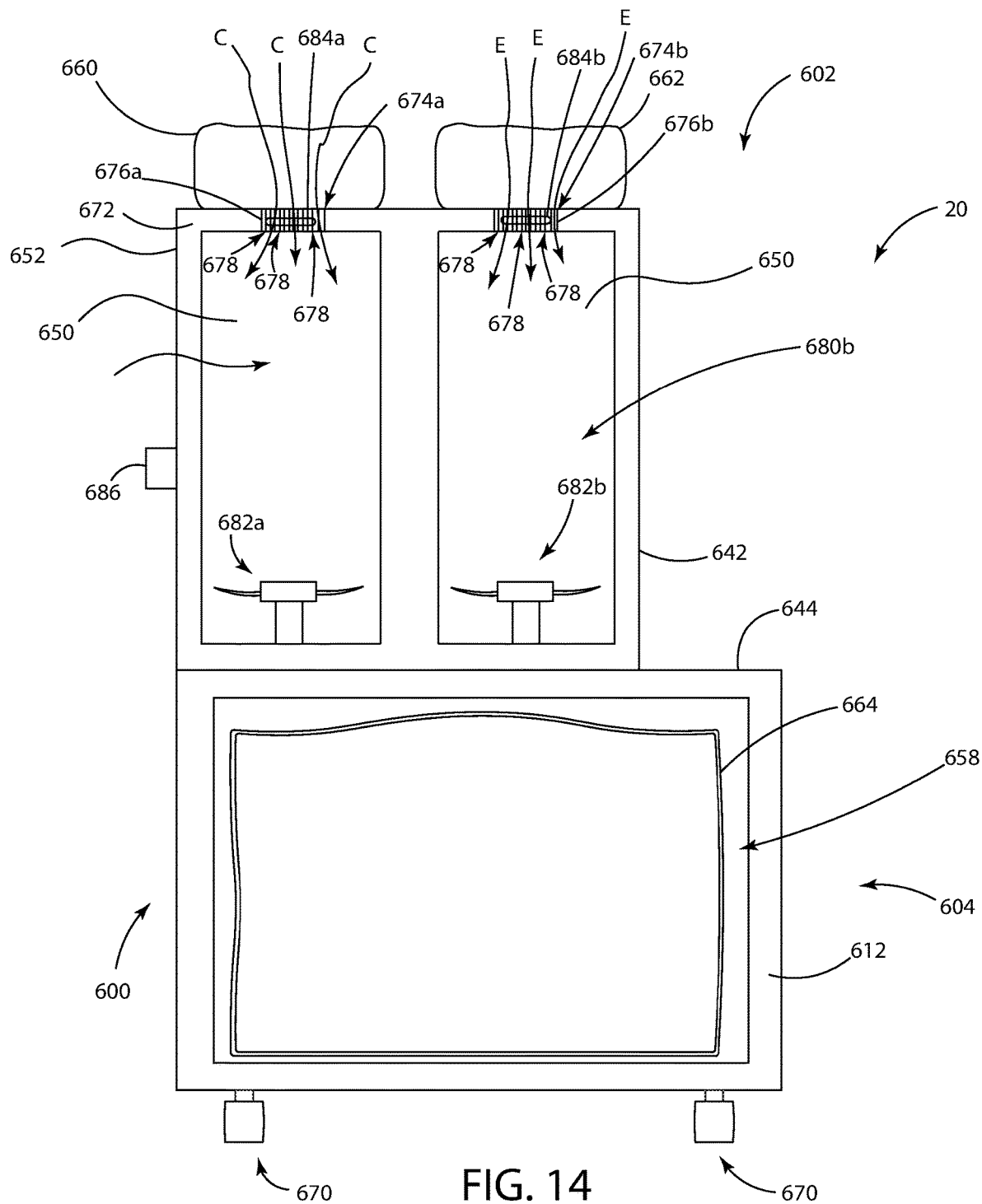
FIG. 14 is a side, cross-sectional view of one embodiment of the test station shown in FIG. 13, in accordance with the principles of the present disclosure.
Figure 15:
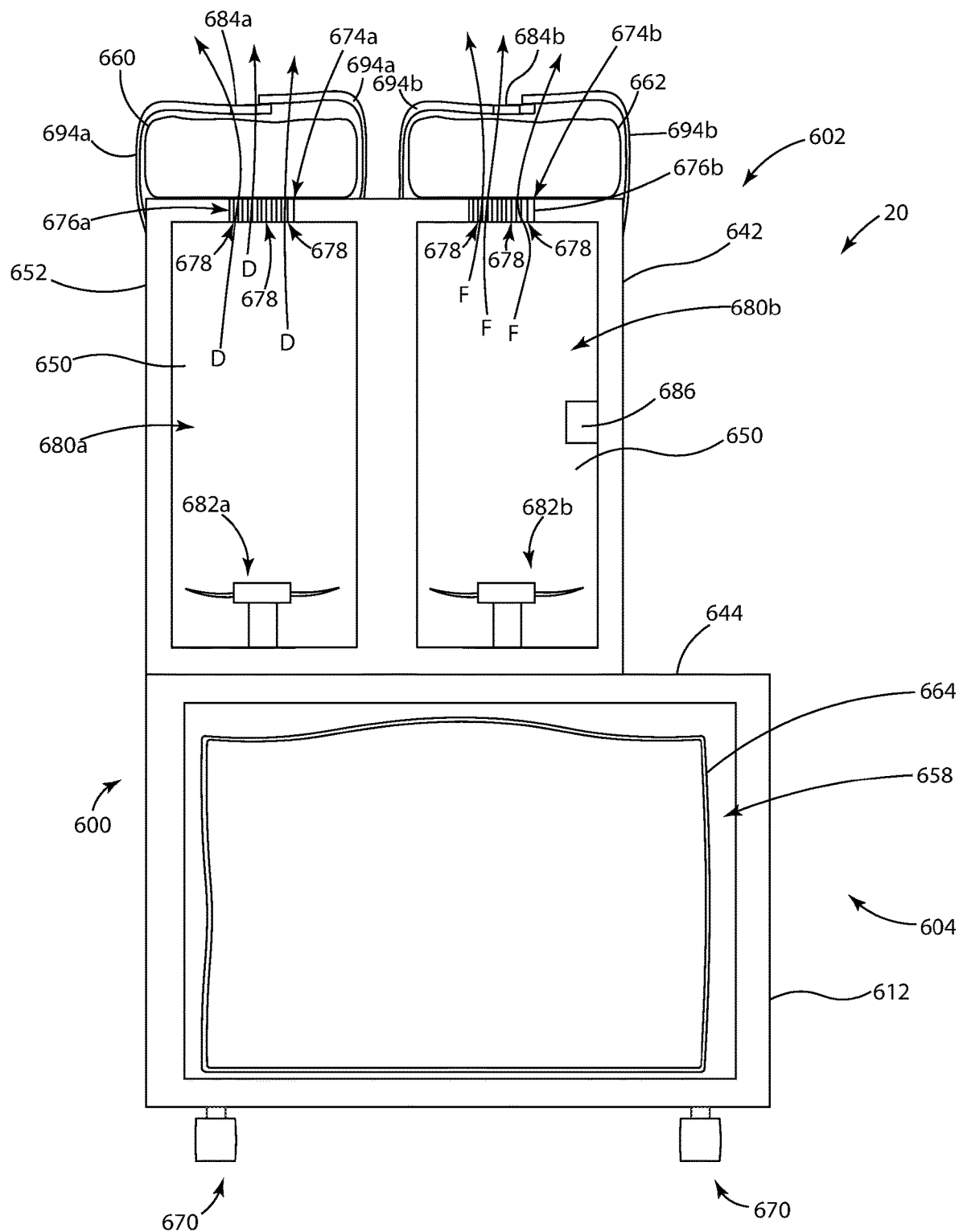
FIG. 15 is a side, cross-sectional view of one embodiment of the test station shown in FIG. 13, in accordance with the principles of the present disclosure.

In one embodiment, shown in FIGS. 13-15, cart 600 is configured to test two test articles, such as, for example, two of pillows 656, 660, 662, 664, 666 simultaneously. Accordingly, portion 602 includes a partition 700 that divides chamber 680 into a first chamber 680a and a second chamber 680b that is spaced apart from chamber 680a by partition such that chamber 680b is not in communication with chamber 680a, as best shown in FIGS. 14 and 15. Wall 672 includes openings 674a and 674b that are similar to opening 674. Opening 674a is spaced apart from opening 674b by a portion of wall 672, as best shown in FIG. 13. A first grate 676a, similar to grate 676 is positioned in opening 674a and a second grate 676b, similar to grate 676 is positioned in opening 674b. Grates 676a, 676b each include a plurality of spaced apart holes 678. Holes 678 of grate 676a are in communication with chamber 680a and holes 678 of grate 676b are in communication with chamber 680b. It is envisioned that cart 600 can include any number of grates 676. In some embodiments, the number of grates 676 included in cart 600 can correlate to the number of test articles to be tested. For example, if a tester desires to test three test articles simultaneously, cart 600 will include three spaced apart grates 676, each in communication with a different chamber 680. Likewise, if a tester desires to test four test articles simultaneously, cart 600 will include four spaced apart grates 676, each in communication with a different chamber 680.

In one embodiment, shown in FIG. 14, cart 600 includes a first sensor 684a, similar to sensor 684 positioned within a thickness of grate 676a such that sensor 684a extends across at least one of holes 678 of grate 676a and cart 600 includes a second sensor 684b, similar to sensor 684 positioned within a thickness of grate 676b such that sensor 684b extends across at least one of holes 678 of grate 676b. However, it is envisioned that sensors 684a, 684b may be variously positioned with respect to cart 600 in any manner that allows sensors 684a, 684b to be in communication with air and/or moisture that moves through a test article. For example, in one embodiment, shown in FIG. 15, cart 600 includes a first strap 694a and a second strap 696a that is configured to removably engage strap 694a to a test article to cart 600. Sensor 684a is coupled to one of straps 694a, 696a to allow sensor 684a to measure the pressure imposed by air and/or moisture as air and/or moisture moves through a test article positioned over grate 676a. Likewise, cart 600 includes a first strap 694b and a second strap 696b that is configured to removably engage strap 694b to a test article to cart 600. Sensor 684b is coupled to one of straps 694b, 696b to allow sensor 684b to measure the pressure imposed by air and/or moisture as air and/or moisture moves through a test article positioned over grate 676b. In some embodiments, strap 696*a* can be coupled to strap 694*a* and/or strap 696*b* can be coupled to strap 694*b* by Velcro, threads, mutual grooves, screws, adhesive, nails, barbs, raised elements, spikes, clips, snaps, friction fittings, compressive fittings, expanding rivets, staples, fixation plates, key/keyslot, tongue in groove, dovetail, magnetic connection and/or posts. However, it is envisioned that sensor 684*a* and/or sensor 684*b* may be mounted to cart 600 using brackets similar to brackets 690, 692 and/or using an arm similar to arm 698, depending upon the requirements of a particular application. It is envisioned that cart 600 can include any number of sensors 684. In some embodiments, the number of sensors 684 included in cart 600 can correlate to the number of test articles to be tested. For example, if a tester desires to test three test articles simultaneously, cart 600 will include three spaced apart sensors 684, each configured to measure the amount of air flow through a different test article. Likewise, if a tester desires to test four test articles simultaneously, cart 600 will include four spaced apart sensors 684, configured to measure the amount of air flow through a different test article.

Cart 600 includes a first air flow generator 682*a* positioned in chamber 680*b* and a second air flow generator 682*b* positioned in chamber 680*a*. Air flow generator 682*a* is positioned directly below grate 676*a* such that air flow generator 682*a* is coaxial with grate 676*a* and/or at least one of holes 678 in grate 676*a*. Air flow generator 682*a* is configured to create negative pressure to draw air and/or moisture C outside of chamber 680*a* through a test article, such as, for example, one of pillows 656, 660, 662, 664, 666 and into chamber 680*a* through holes 678 of grate 676*a*, as shown in FIG. 14 and/or create positive pressure to move air and/or moisture D within chamber 680*a* through holes 678 of grate 676*a* and one of pillows 656, 660, 662, 664, 666, as shown in FIG. 15. Likewise, air flow generator 682*b* is configured to create negative pressure to draw air and/or moisture E outside of chamber 680*b* through a test article, such as, for example, one of pillows 656, 660, 662, 664, 666 and into chamber 680*b* through holes 678 of grate 676*b*, as shown in FIG. 14 and/or create positive pressure to move air and/or moisture F within chamber 680*b* through holes 678 of grate 676*b* and one of pillows 656, 660, 662, 664, 666, as shown in FIG. 15. In some embodiments, air flow generator 682*a* is configured to create the same amount of negative and/or positive pressure as air flow generator 682*b* such that air flow generators 682*a*, 682*b* will each create the same amount of air flow when air flow generators 682*a*, 682*b* are in an on position. As such, air flow generators 682*a*, 682*b* will each provide the same amount of air flow through the same test article when air flow generators 682*a*, 682*b* are in the on position. It is envisioned that cart 600 can include any number of air flow generators 682. In some embodiments, the number of air flow generators 682 included in cart 600 can correlate to the number of test articles to be tested. For example, if a tester desires to test three test articles simultaneously, cart 600 will include three spaced apart air flow generators 682, each positioned in a different chamber 680. Likewise, if a tester desires to test four test articles simultaneously, cart 600 will include four spaced apart air flow generators 682, each positioned in a different chamber 680.

In operation and use, a first test article, such as, for example, one of pillows 656, 660, 662, 664, 666 is positioned on wall 672 such that the first test article covers at least a portion of grate 676*a* and a second test article, such as, for example, one of pillows 656, 660, 662, 664, 666 is positioned on wall 672 such that the first test article covers at least a portion of grate 676*b*. Air flow generator 682*a* is moved from an off position to an on position such that air flow generator 682*a* creates negative pressure that draws air and/or moisture C through the first test article and holes 678 in grate 676*a* and into chamber 680*a*. Sensor 684*a* measures the pressure imposed by air and/or moisture C as air and/or moisture C moves through the first test article. Sensor 684*a* sends a signal to processor 686 representative of a pressure value (in pounds per square inch, for example) measured by sensor 684*a*. Processor 686 converts the pressure value into to a first air flow value (in cubic feet per minute, for example). Processor 686 then communicates with display 688 to provide a graphical representation of the first air flow value on display 688. Air flow generator 682*b* is moved from an off position to an on position such that air flow generator 682*b* creates negative pressure that draws air and/or moisture E through the second test article and holes 678 in grate 676*b* and into chamber 680*b*. Sensor 684*b* measures the pressure imposed by air and/or moisture E as air and/or moisture E moves through the second test article. Sensor 684*b* sends a signal to processor 686 representative of a pressure value (in pounds per square inch, for example) measured by sensor 684*b*. Processor 686 converts the pressure value into to a second air flow value (in cubic feet per minute, for example). Processor 686 then communicates with display 688 to provide a graphical representation of the second air flow value on display 688. In some embodiments, the graphical representations of the first and second air flow values are shown on display 688 simultaneously to allow a tester to quickly see any differences between the first air flow value and the second air flow value. The tester may select for purchase the test article having the air flow value that is closest to a desired air flow value. For example, if the tester desires a pillow that permits a low amount of air flow through the pillow to provide a warm sleeping surface, the tester may select for purchase the test article having the lower air flow value. In some embodiments, the tester may test one or a plurality of test articles in addition to the first test article and the second test article, in the same manner the first and second test articles were tested.

In one embodiment, a first test article, such as, for example, one of pillows 656, 660, 662, 664, 666 is positioned on wall 672 such that the first test article covers at least a portion of grate 676*a* and a second test article, such as, for example, one of pillows 656, 660, 662, 664, 666 is positioned on wall 672 such that the first test article covers at least a portion of grate 676*b*. Air flow generator 682*a* is moved from an off position to an on position such that air flow generator 682*a* creates positive pressure that moves air and/or moisture D within chamber 680*a* through holes 678 in grate 676*a* and the first test article. Sensor 684*a* measures the pressure imposed by air and/or moisture D as air and/or moisture D moves through the first test article. Sensor 684*a* sends a signal to processor 686 representative of a pressure value (in pounds per square inch, for example) measured by sensor 684*a*. Processor 686 converts the pressure value into to a first air flow value (in cubic feet per minute, for example). Processor 686 then communicates with display 688 to provide a graphical representation of the first air flow value on display 688. Air flow generator 682*b* is moved from an off position to an on position such that air flow generator 682*b* creates positive pressure that moves air and/or moisture F through holes 678 in grate 676*b* and the second test article. Sensor 684*b* measures the pressure imposed by air and/or moisture F as air and/or moisture F moves through the second test article. Sensor 684*b* sends a signal to processor 686 representative of a pressure value (in pounds per square inch, for example) measured by sensor 684*b*.

Processor 686 converts the pressure value into to a second air flow value (in cubic feet per minute, for example). Processor 686 then communicates with display 688 to provide a graphical representation of the second air flow value on display 688. In some embodiments, the graphical representations of the first and second air flow values are shown on display 688 simultaneously to allow a tester to quickly see any differences between the first air flow value and the second air flow value. In some embodiments, the tester may test one or a plurality of test articles in addition to the first test article and the second test article, in the same manner the first and second test articles were tested.

It will be understood that various modifications may be made to the embodiments disclosed herein. For example, features of any one embodiment can be combined with features of any other embodiment. Therefore, the above description should not be construed as limiting, but merely as exemplification of the various embodiments. Those skilled in the art will envision other modifications within the scope and spirit of the claims appended hereto.

What is claimed is:

1. A test station comprising:
    a test article;
    a housing defining a chamber, the housing being configured to support the test article such that the test article is in fluid communication with the chamber;
    an air flow generator in fluid communication with the chamber, the air flow generator being configured to move air through the test article;
    a sensor configured to measure pressure created by air that moves through the test article;
    a processor in communication with the sensor, the processor being configured to convert a pressure value measured by the sensor to an air flow value; and
    a display in communication with the processor to provide a visual representation of the air flow value.

2. The test station recited in claim 1, further comprising a display coupled to the housing, the display being in communication with the sensor to provide a visual representation of data obtained by the sensor.

3. The test station recited in claim 1, wherein the pressure value is measured by the sensor in pounds per square inch and the air flow value is measured in cubic feet per minute.

4. The test station recited in claim 1, wherein the air flow generator is positioned within the chamber.

5. The test station recited in claim 1, wherein the air flow generator is an air pump.

6. The test station recited in claim 1, wherein the sensor is positioned within the chamber.

7. The test station recited in claim 1, wherein the sensor is positioned outside of the chamber.

8. The test station recited in claim 1, wherein the housing comprises a top wall configured to support the test article, the housing comprising a grate in the top wall, the grate comprising a plurality of openings that are in communication with the chamber.

9. The test station recited in claim 1, wherein the housing comprises a top wall configured to support the test article, the housing comprising a grate in the top wall, the grate comprising a plurality of openings that are in communication with the chamber, the sensor being coupled to the grate.

10. The test station recited in claim 1, wherein the housing comprises a top portion that includes the chamber and a bottom portion that is coupled to the top portion, the bottom portion comprising a plurality of spaced apart casters.

11. The test station recited in claim 1, wherein:
    the housing comprises a top portion that includes the chamber and a bottom portion that is coupled to the top portion, the bottom portion comprising a cavity and a plurality of spaced apart dividers positioned within the cavity; and
    wherein the test station comprises a second test article positioned in the cavity between adjacent dividers.

12. The test station recited in claim 1, wherein:
    the housing comprises a top portion that includes the chamber and a bottom portion that is coupled to the top portion, the bottom portion comprising a top wall; and
    wherein the test station comprises a dispenser positioned on the top wall, the dispenser comprising a carton and a spool, the spool comprising a plurality of napkins that are wound about the spool, the spool being positioned within the carton such that the napkins are dispensed from the spool as the spool unwinds.

13. The test station recited in claim 1, wherein the test article is a pillow.

14. A test station comprising:
    a test article;
    a housing defining a chamber, the housing being configured to support the test article such that the test article is in fluid communication with the chamber;
    an air flow generator in fluid communication with the chamber, the air flow generator being configured to move air through the test article; and
    a sensor configured to measure pressure created by air that moves through the test article,
    wherein the housing comprises a top wall configured to support the test article, the housing comprising a grate in the top wall, the grate comprising a plurality of openings that are in communication with the chamber.

15. The test station recited in claim 14, further comprising a display coupled to the housing, the display being in communication with the sensor to provide a visual representation of data obtained by the sensor.

16. The test station recited in claim 14, wherein the air flow generator is positioned within the chamber.

17. The test station recited in claim 14, wherein the air flow generator is an air pump.

18. The test station recited in claim 14, wherein the sensor is positioned within the chamber.

19. The test station recited in claim 14, wherein the sensor is positioned outside of the chamber.

20. A test station comprising:
    a test article;
    a housing defining a chamber, the housing being configured to support the test article such that the test article is in fluid communication with the chamber;
    an air flow generator in fluid communication with the chamber, the air flow generator being configured to move air through the test article; and
    a sensor configured to measure pressure created by air that moves through the test article,
    wherein the housing comprises a top wall configured to support the test article, the housing comprising a grate in the top wall, the grate comprising a plurality of openings that are in communication with the chamber, the sensor being coupled to the grate.

21. The test station recited in claim 5, further comprising a display coupled to the housing, the display being in communication with the sensor to provide a visual representation of data obtained by the sensor.

22. The test station recited in claim 5, wherein the air flow generator is positioned within the chamber.

23. The test station recited in claim 5, wherein the air flow generator is an air pump.

24. The test station recited in claim 5, wherein the sensor is positioned within the chamber.

25. The test station recited in claim 18, wherein the sensor is positioned outside of the chamber.

* * * * *